(12) United States Patent
Findenig et al.

(10) Patent No.: US 12,736,616 B2
(45) Date of Patent: Sep. 15, 2026

(54) INTERFERENCE MITIGATION USING CONDITIONAL SEQUENCING DURING RADAR RAMP SCENARIO

(71) Applicant: Infineon Technologies AG, Neubiberg (DE)

(72) Inventors: Rainer Findenig, Linz (AT); Bernhard Greslehner-Nimmervoll, Hagenberg (AT)

(73) Assignee: Infineon Technologies AG, Neubiberg (DE)

( * ) Notice: Subject to any disclaimer, the term of this patent is extended or adjusted under 35 U.S.C. 154(b) by 268 days.

(21) Appl. No.: 18/420,228

(22) Filed: Jan. 23, 2024

(65) Prior Publication Data

US 2025/0237738 A1 Jul. 24, 2025

(51) Int. Cl.
*G01S 7/35* (2006.01)
*G01S 13/931* (2020.01)

(52) U.S. Cl.
CPC .............. *G01S 7/35* (2013.01); *G01S 13/931* (2013.01)

(58) Field of Classification Search
CPC ........ G01S 7/35; G01S 13/931; G01S 7/0232; G01S 13/343; G01S 7/36; G01S 7/41; G01S 7/411; G01S 13/34
See application file for complete search history.

(56) References Cited

U.S. PATENT DOCUMENTS

| | | | | |
|---|---|---|---|---|
| 12,121,331 | B1 * | 10/2024 | Arool Emmanuel | G01S 13/40 |
| 2015/0002328 | A1 * | 1/2015 | Vaucher | G01S 7/35 342/88 |
| 2022/0120852 | A1 * | 4/2022 | Findenig | G06F 5/06 |
| 2023/0131287 | A1 * | 4/2023 | Takayama | G01S 13/343 342/196 |

* cited by examiner

*Primary Examiner* — Jack W Keith
*Assistant Examiner* — Clayton Paul Ridder
(74) *Attorney, Agent, or Firm* — Harrity & Harrity, LLP

(57) ABSTRACT

A radar semiconductor chip includes a ramp signal generator and a sequencer. The ramp signal generator generates a frequency-modulated ramp signal including a ramp scenario having two consecutive portions demarked by a decision point. A first portion includes at least one first frequency ramp defined by a first value of a ramp parameter. The second portion includes at least one second frequency ramp defined by a second value or by a third value of the ramp parameter. The sequencer controls the ramp signal generator to generate the at least one second frequency ramp with the second value of the ramp parameter, based on an indicator not being received prior to the decision point. The sequencer controls the ramp signal generator to generate the at least one second frequency ramp with the third value of the ramp parameter, based on the indicator being received prior to the decision point.

24 Claims, 14 Drawing Sheets

900A

INTERFERENCE MITIGATION USING CONDITIONAL SEQUENCING DURING RADAR RAMP SCENARIO

BACKGROUND

Radar sensors are used in a number of applications to detect objects, where the detection typically comprises measuring distances, velocities, or angles of arrival associated with detected targets. In particular, in the automotive sector, there is an increasing need for radar sensors that are able to be used in, for example, driving assistance systems (e.g., advanced driver assistance systems (ADAS)), such as, for example, in adaptive cruise control (ACC) or radar cruise control systems. Such systems are able to automatically adjust a speed of a motor vehicle in order to maintain a safe distance from other motor vehicles traveling in front of the motor vehicle (and from other objects and pedestrians). Other example applications of a radar sensor in the automotive sector include blind spot detection, lane change assist, and the like.

SUMMARY

In some implementations, a radar semiconductor chip includes a ramp signal generator configured to generate a frequency-modulated ramp signal comprising a ramp scenario, wherein the ramp scenario comprises at least two consecutive portions, including a first portion and a second portion that are demarked by a decision point, wherein the first portion includes at least one first frequency ramp defined by a first value of a ramp parameter, and wherein the second portion includes at least one second frequency ramp defined by a second value of the ramp parameter or by a third value of the ramp parameter that is different from the second value of the ramp parameter; and a sequencer configured to monitor for an indicator, wherein the sequencer is configured to control the ramp signal generator to generate the at least one second frequency ramp with the second value of the ramp parameter, based on the indicator not being received prior to the decision point, and wherein the sequencer is configured to control the ramp signal generator to generate the at least one second frequency ramp with the third value of the ramp parameter, based on the indicator being received prior to the decision point.

In some implementations, a method for controlling a radar circuit of a radar semiconductor chip includes generating, by a ramp signal generator, a frequency-modulated ramp signal comprising a ramp scenario, wherein the ramp scenario comprises at least two consecutive portions, including a first portion and a second portion that are demarked by a decision point, wherein the first portion includes at least one first frequency ramp defined by a first value of a ramp parameter, and wherein the second portion includes at least one second frequency ramp defined by a second value of the ramp parameter or by a third value of the ramp parameter that is different from the second value of the ramp parameter; monitoring, by a sequencer, for an indicator; and controlling, by the sequencer, the ramp signal generator to generate the at least one second frequency ramp with the second value of the ramp parameter based on the indicator not being received prior to the decision point, or to generate the at least one second frequency ramp with the third value of the ramp parameter based on the indicator being received prior to the decision point.

BRIEF DESCRIPTION OF THE DRAWINGS

Implementations are described herein making reference to the appended drawings.

DETAILED DESCRIPTION

Figure 1:
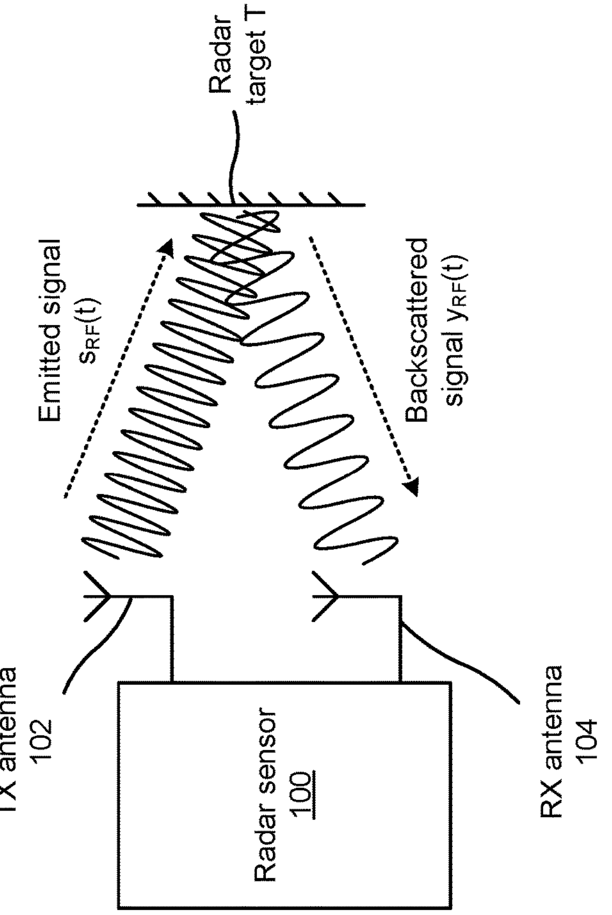
FIG. 1 is a diagram of an example application of a frequency-modulated continuous-wave (FMCW) radar sensor.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar monolithic microwave integrated circuit (MMIC), sometimes referred to as a single radar chip, may incorporate all core functions of a radio frequency (RF) frontend of a radar transceiver (e.g., local oscillator, power amplifiers, low-noise amplifiers (LNAs), mixers, etc.), analog preprocessing of the intermediate frequency (IF) or baseband signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, etc., are used. In radar applications, phased antenna arrays may be employed to sense an incidence angle of incoming RF radar signals (also referred to as "direction of arrival" or DOA).

A microcontroller may act as a supervisor for a radar MMIC by sending commands and receiving responses over one or more communication channels (e.g., a bus system, such as a serial peripheral interface (SPI)). As a result, the radar MMIC may be controlled by the microcontroller.

Frequency-modulated continuous-wave (FMCW) radar applications rely on transmitting multiple frequency sweeps in a time-controlled manner. For example, the radar MMIC may include a ramp signal generator that is configured to generate a frequency-modulated ramp signal (e.g., an FMCW ramp signal) that includes a plurality of frequency ramps of a ramp scenario. In addition to generating the frequency-modulated ramp signal, the radar MMIC may be responsible for performing several on-chip functions, such as temperature monitoring, power or phase monitoring, receiver gain monitoring, decimation rate reconfiguration, and/or interference mitigation actions. The on-chip functions should be performed synchronously with a transmission of the frequency ramps or should be performed between different frequency ramp sequences of the ramp scenario. In some cases, the on-chip functions should be performed without disrupting timing relationships between individual frequency ramps and/or between the different frequency ramp sequences of the ramp scenario.

FMCW radar systems are becoming more prevalent in vehicles in order to enable ADAS, as well as autonomous driving features. All automotive radar devices emit electromagnetic waves in a same frequency range (e.g., 76-81 GHz). As a result, radar sensors of automotive radar devices potentially interfere with each other. With more and more vehicles being equipped with radar sensors, interference between vehicles is expected to increase. For example, in some cases, a noise floor of the automotive radar devices can be severely affected by interference from other automotive radar devices. Thus, objects may be covered in noise caused by the interference, which makes object detection temporarily impossible.

The frequency ramps of each ramp scenario are typically preconfigured with one or more ramp parameters, such as start frequency, stop frequency, bandwidth, power amplifier setting, transmit phase, and duration. For example, each frequency ramp of a ramp scenario may have a same start frequency value, a same stop frequency value, and a same duration value. Different ramp scenarios may be configured with different ramp parameter values. However, a ramp scenario is typically fixed during execution such that the ramp parameter values used for the frequency ramps do not change from the preconfigured ramp parameter values.

Due to a repetition of the frequency ramps in a ramp scenario, if an interferer is present in a currently selected frequency band, it is likely that not only a single frequency ramp, but a significant portion of the ramp scenario will contain interference. A microcontroller receiving ramp data from a radar sensor can usually detect interference based on a single frequency ramp, but since ramp scenarios are typically executed by hardware of the radar sensor, reacting on the interference is not trivial. For example, the microcontroller needs to inform the radar sensor that a given parameter should be modified, but at the same time, the microcontroller needs to know an exact point within the ramp scenario where this change will take effect in order to be able to correctly process radar data provided by the radar sensor. In other words, the microcontroller needs to know the ramp parameter values and which instance in time those ramp parameter values are implemented in order to correctly process radar data provided by the radar sensor. Radar systems are currently not designed to change preconfigured ramp parameter values during execution of a ramp scenario, despite interference being present. Instead, the microcontroller may discard all measurement data collected in an interfered ramp scenario.

Some implementations disclosed herein are directed to a radar MMIC that is configured to maintain or change ramp parameter values during execution of a ramp scenario based on interference being detected. For example, decision points may be introduced, into a sequencing program, that act as a predefined branch in the sequencing program. Each predefined branch may be associated with a different set of ramp parameter values. The radar MMIC may select which predefined branch to implement at each decision point based on interference being detected. The radar MMIC or a microcontroller may decide at each decision point, during execution of the sequencing program, which predefined branch should be taken for generating a next portion of the ramp scenario. Additionally, the radar MMIC and the microcontroller may communicate regarding which predefined branch has been taken, with timing information associated with the predefined branch. Thus, the microcontroller is aware of which ramp parameter values are being implemented and a timing thereof in order to correctly process radar data provided by the radar sensor.

In some implementations, a sequencer may read a sequencing program that is associated with generating a frequency-modulated ramp signal based on ramp operation codes (opcodes) of the sequencing program. The sequencing program may also include one or more decision points. The sequencer may be configured to read the sequencing program from a memory, derive control values for a plurality of ramp parameters based on the ramp opcodes, and provide the control values to the ramp signal generator for generation of the frequency-modulated ramp signal. The ramp scenario may be programmed to, depending on an input that can be set asynchronously by a microcontroller (e.g., using a demultiplexer or SPI interface), either stay in a current frequency band or switch to a different frequency band. Additionally, or alternatively, one of two frequency bands may be selected at a decision point based on the input received prior to the decision point. A frequency band may be defined as a frequency range between the start frequency and the stop frequency. The different frequency band could be used if interference is detected prior to a corresponding decision point in order to move the frequency band out of an interference frequency band. For example, the different frequency band could be used if interference is detected while frequency ramps preceding the corresponding decision point are generated. Thus, the sequencer may determine during execution of the ramp scenario whether to change the ramp parameter values for the frequency ramps that follow the corresponding decision point.

In some implementations, a dedicated opcode or a specific marker in an existing opcode may be provided in the sequencing program to define a decision point. When a program execution reaches the dedicated opcode (e.g., the decision point), the sequencer may evaluate an input or indicator to determine which predefined branch in the sequencing program to follow. In some implementations, multiple decision points may be defined for a single ramp scenario, with each decision point providing two or more predefined branches or options to choose from based on the input or indicator.

FIG. 1 is a diagram illustrating an example application of an FMCW radar sensor in the form of a radar sensor 100 for measuring distances, velocities, or angles of arrival (AoAs) associated with objects, also referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits an RF signal $s_{RF}(t)$ (also referred to as a transmitted radar signal), which is frequency-modulated, for example, by a periodic linear frequency ramp signal (also referred to as a frequency sweep or chirp signal). The transmitted radar signal $s_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar sensor 100 may include a plurality of TX antennas 102 and RX antennas 104 to be able to determine an AoA of the received RF signal $y_{RF}(t)$ and, therefore, locate the target T with increased accuracy as compared to a radar sensor that may use a single TX antenna and/or a signal RX antenna.

It will be appreciated that "(t)" denotes an analog signal defined as a continuous-time signal that may change over a time period t, and "[n]" denotes a digital signal defined as a discrete-time signal, where n is an integer and may represent an nth sample or a signal containing n samples. A signal may be represented with or without its continuous-time or discrete-time domain identifier (t) and [n], respectively. It will be further appreciated that RF circuits, such as the radar sensor 100, may be used in fields other than radar. For example, RF circuits may be used in RF communication systems. Accordingly, in some implementations, the radar sensor 100 may be used in RF applications other than radar, such as RF communications.

As indicated above, FIG. 1 is provided as an example. Other examples may differ from what is described with regard to FIG. 1.

Figure 2:
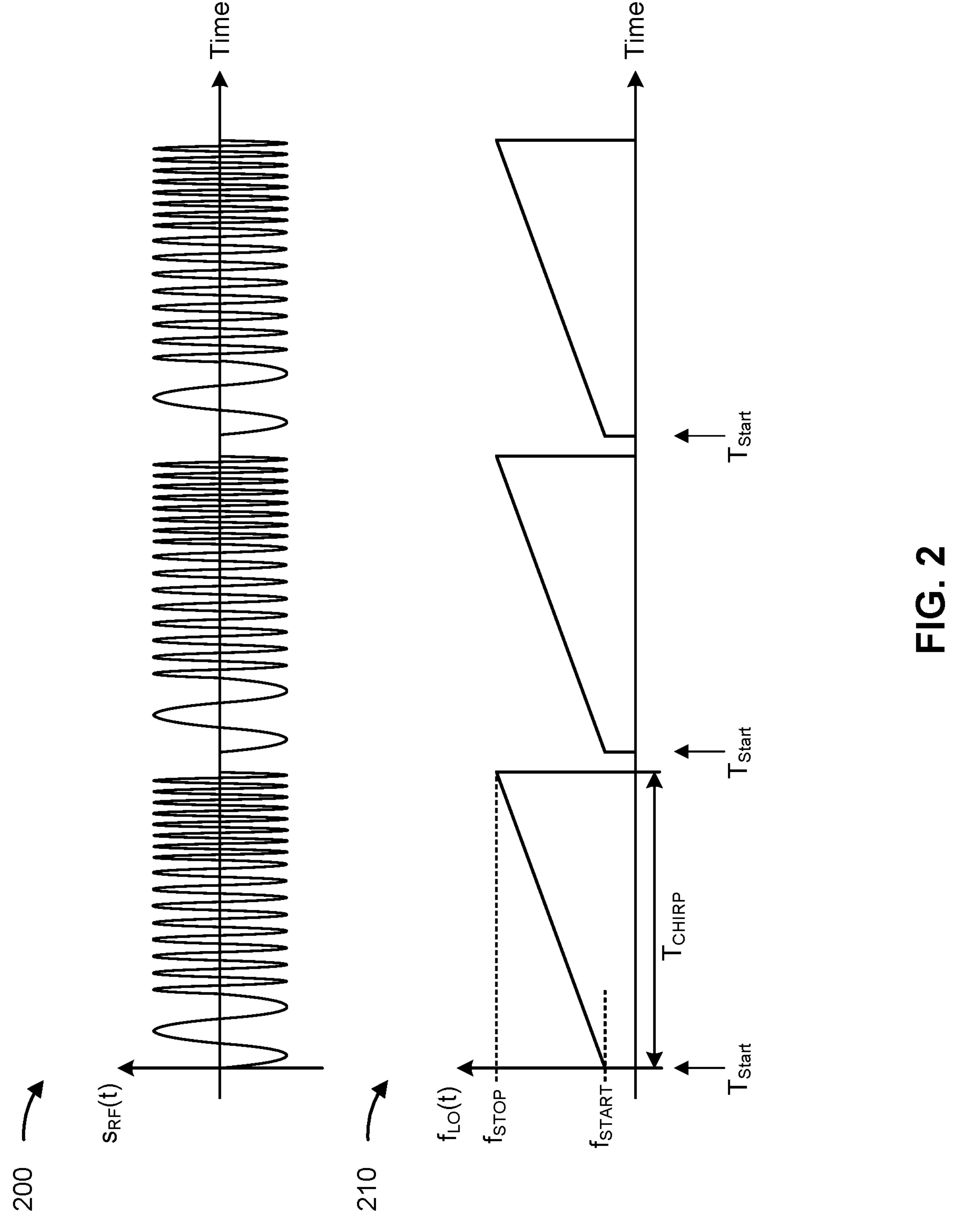
FIG. 2 illustrates an example of frequency modulation of a transmitted radar signal transmitted by the FMCW radar sensor.

FIG. 2 illustrates an example of the frequency modulation of the RF signal $s_{RF}(t)$. As illustrated in the upper diagram 200 of FIG. 2, the RF signal $s_{RF}(t)$ comprises a plurality of frequency ramps or a series of "chirps"; that is to say, the RF signal $s_{RF}(t)$ comprises a sequence of sinusoidal signal profiles (e.g., waveforms) with a rising frequency (referred to as an up-chirp) or a falling frequency (referred to as a down-chirp). In the example shown in FIG. 2, the instantaneous frequency $f_{LO}(t)$ of a chirp increases linearly, from a start frequency $f_{START}$ to a stop frequency $f_{STOP}$ within a time interval $T_{CHIRP}$, as shown in the lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as a local oscillator signal used for generating a radar signal, may include a plurality of radar frames, which may also be referred to as radar operation cycles or chirp frames. A sequence of ramps may make up each radar frame. For example, a radar operation cycle may include several hundreds of radar ramps (sweeps) taking up to 10-30 milliseconds (ms) in total. A frame length of the radar frame may correspond to one radar operation cycle. Consecutive ramps may have a short pause therebetween, and a longer pause may be used between consecutive radar frames. The longer pause between consecutive radar frames may be referred to as a configuration interval, during which one or more ramp parameters of the RF signal $s_{RF}(t)$ can be adjusted for subsequent radar frames. A ramp start time $T_{START}$ indicates a start time for each chirp and may occur at a predetermined interval according to, for example, a number of clock cycles.

The start frequency $f_{START}$ and stop frequency $f_{STOP}$ of the ramps may be within a frequency band with minimum frequency Fmin and maximum frequency Fmax. As a result, the minimum frequency Fmin and the maximum frequency Fmax define an operating frequency range or a frequency band usable for the ramping signals, and thus the frequency range or the frequency band of the radar application of a radar MMIC. In some implementations, the frequency range defined by a single ramp having start and stop frequencies $f_{START}$ and $f_{STOP}$ may be smaller than the usable radar frequency band. However, all ramps that are generated during operation may lie between the frequencies Fmin and Fmax of the radar frequency band (e.g., between 76-81 GHz) used for generating the ramping signals.

FIG. 2 illustrates three identical linear frequency ramps or chirps. However, the parameters $f_{START}$, $f_{STOP}$, $T_{CHIRP}$, and/or the pause between the individual frequency ramps may vary depending on the actual implementation and/or use of the radar sensor 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency Fmin of 76 gigahertz (GHz) and a maximum frequency Fmax of 81 GHz.

Thus, while three identical linear frequency ramps or chirps with the same start frequency $f_{START}$ and stop frequency $f_{STOP}$ are illustrated in FIG. 2, the start frequency $f_{START}$ and stop frequency $f_{STOP}$ may vary within a radar frame or across multiple radar frames. A local oscillator signal $S_{LO}(t)$ may be used to generate the RF signal $S_{RF}(t)$. Thus, it can be said that the local oscillator signal $S_{LO}(t)$ and the RF signal $S_{RF}(t)$ are frequency-modulated ramp signals that are generated within an operating frequency range (e.g., a predefined radar frequency range). For example, the local oscillator signal $S_{LO}(t)$ may be a frequency-modulated ramp signal that includes a plurality of frequency ramps, each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same, and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference.

As indicated above, FIG. 2 is provided as an example. Other examples may differ from what is described with regard to FIG. 2.

Figure 3:
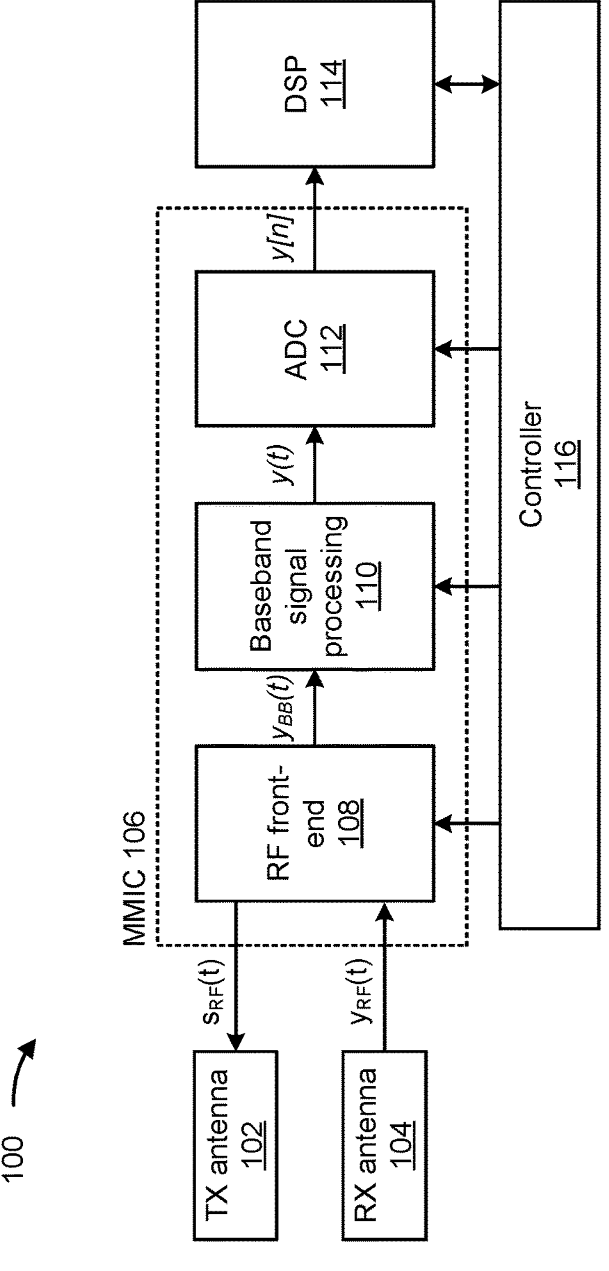
FIG. 3 is a block diagram that illustrates an example structure of the FMCW radar sensor.

FIG. 3 is a block diagram that illustrates an example structure of the radar sensor 100. As shown, the radar sensor 100 may include one or more TX antennas 102, one or more RX antennas 104, a radar MMIC 106 (comprising an RF front-end 108, a baseband signal processing circuit 110, and an analog-to-digital converter (ADC) 112), a digital signal processor (DSP) 114, and a controller 116. In some implementations, the MMIC may include a digital front-end (DFE) coupled downstream from the ADC 112. The digital front-end may include circuit components associated with performing signal processing on a digital signal generated by the ADC 112 (e.g., digital filtering). In some cases, the DFE may include the DSP 114.

In the radar sensor 100, the one or more TX antennas 102 and the one or more RX antennas 104 are connected to the RF front-end 108. The RF front-end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an intermediate frequency band (IF band). The RF front-end 108 may be integrated into the radar MMIC 106 with one or more other components, as shown in FIG. 3. The IF band is sometimes also referred to as baseband. Accordingly, “baseband” and “IF band” may be used interchangeably herein. Baseband signals are those signals on the basis of which radar targets are detected.

Antenna arrays may be used instead of single antennas. The depicted example shows a bistatic (or pseudo-monostatic) radar system, which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX and RX channels, which allows for measurement of the direction (e.g., direction of arrival) from which the radar echoes are received.

In some implementations, the radar sensor 100 may include a plurality of TX antennas 102 and a plurality of RX antennas 104, which enables the radar sensor 100 to measure an AoA from which radar echoes are received. In the case of such systems, individual TX channels and RX channels may be constructed identically or similarly and may be distributed over one or more radar MMICs 106.

In some implementations, a signal emitted by the TX antenna 102 may be in a range from approximately 20 GHz to approximately 100 GHz, such as in a range between approximately 76 GHz and approximately 81 GHz. As mentioned, a radar signal received by the RX antenna 104 includes radar echoes (e.g., chirp echo signals); that is to say, those signal components that are backscattered at one or more targets.

The received RF signal $y_{RF}(t)$ is downmixed into, for example, baseband to generate a baseband signal $y_{BB}(t)$, and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal y(t) that is derived from the baseband signal $y_{BB}(t)$. The baseband signal $y_{BB}(t)$ may also be referred to as analog radar data. If the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal y(t) to generate a digital baseband signal y[n], also referred to as a digital output signal. The digital baseband signal y[n] is representative of the radar data received in the received RF signal $y_{RF}(t)$. The DSP 114 may be configured to further process the digital baseband signal y[n] in the digital domain. For example, the DSP 114 may be configured to receive the digital radar data in the digital baseband signal y[n] and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar sensor 100 (e.g., by controlling one or more other components of the radar sensor 100, as indicated in FIG. 3). The controller 116 may include, for example, a microcontroller unit (MCU).

In some implementations, the RF front-end 108, the baseband signal processing circuit 110, the ADC 112, and/or the DSP 114 may be integrated in a single radar MMIC 106 (e.g., an RF semiconductor chip). Alternatively, two or more of these components may be distributed over multiple radar MMICs 106. In some implementations, the DSP 114 may be included in the controller 116. In some implementations, the techniques associated with TX monitoring and/or RX monitoring may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
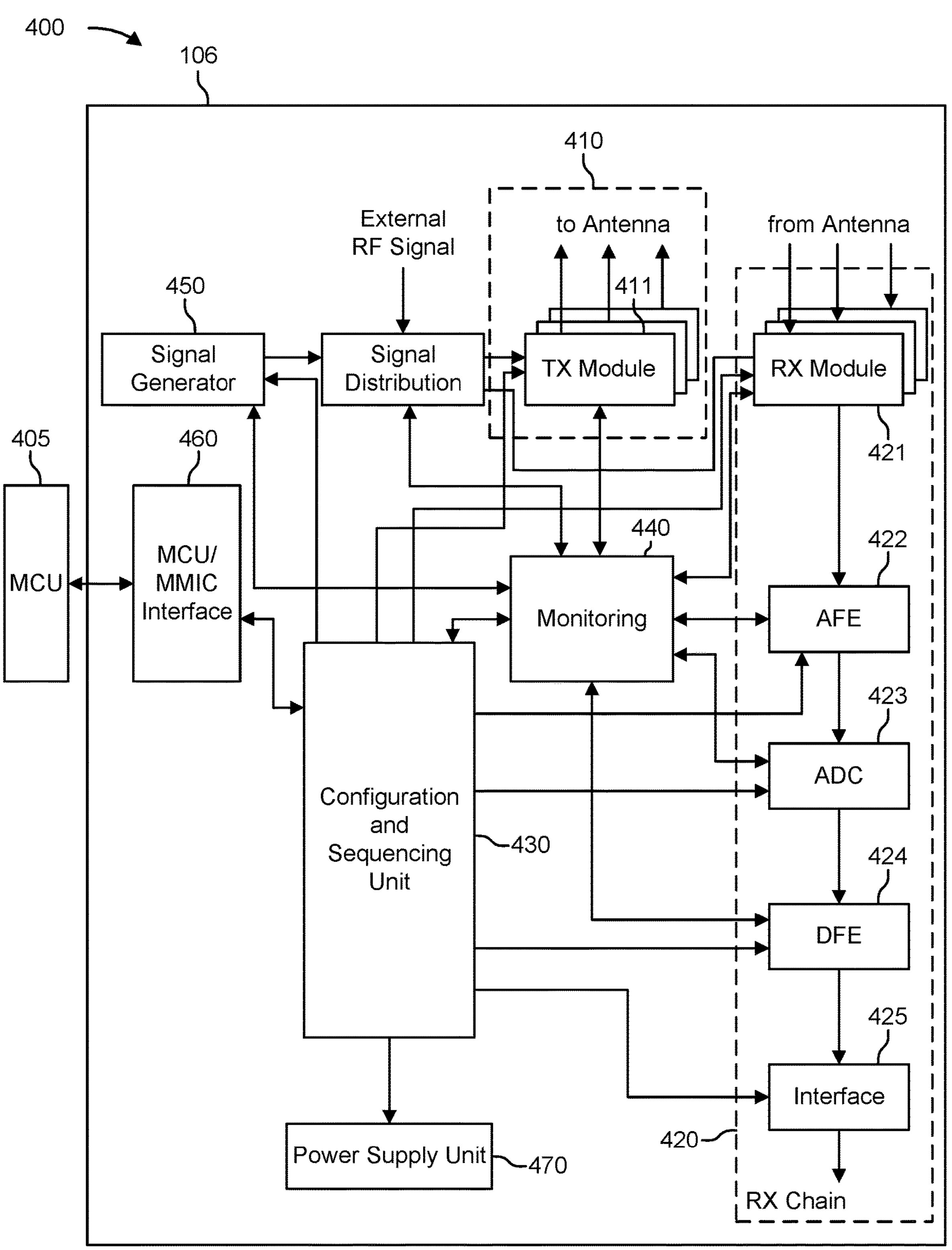
FIG. 4 shows a schematic block diagram of a radar system according to one or more embodiments.

FIG. 4 shows a schematic block diagram of a radar system 400 according to one or more implementations. The radar system 400 includes the radar MMIC 106 (e.g., a semiconductor chip) and an MCU 405. The MCU 405 may correspond to the controller 116 described in connection with FIG. 3. Thus, the MCU 405 may be an external controller. The radar MMIC 106 includes a transmitter 410, including at least one transmit channel 411 for transmitting radar signals, and/or at least one receive channel 420 for receiving and processing radar signals (e.g., radar echos). The radar MMIC 106 may further include a sequencer 430, a monitoring circuit 440, a ramp signal generator 450, a controller/MMIC interface 460, and a power supply unit 470.

The transmit channel 411 may include one or more circuit components and is configured to generate radar transmission signals and to output the radar transmission signals to one or more antennas. As indicated in FIG. 4, the transmitter 410 can comprise one or more of the transmit channels 411. The receive channel 420 may include one or more circuit components and is configured to receive and process one or more radar reception signals from one or more antennas. As indicated in FIG. 4, the receive channel 420 can comprise one or more receivers 421, an analog front-end 422, an ADC 423, a digital front-end 424, and an interface 425.

The analog front-end 422 may include all of the circuit components needed for RF signal processing. Such circuit components may (but need not necessarily) include, for example, an LO, RF power amplifiers, LNAs, directional couplers such as rat-race-couplers and circulators, and mixers for the down-conversion of RF signals into the baseband or an IF band.

Antenna arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX channels and reception RX channels, which among other things allows for the measurement of the direction (e.g., DOA) from which the radar echoes are received.

In the case of an FMCW radar system, the transmitted RF signals radiated by the TX antenna may be in the range between approximately 20 GHz and 100 GHz (e.g., in the frequency band 21 to 26 GHz or in the frequency band 76 to 81 GHZ). As mentioned, the RF signal received by the RX antenna includes the radar echoes (for example, the signal back-scattered at the radar targets).

The received RF signals are down-converted into the baseband (or the IF band) and further processed in the baseband using analog signal processing at the analog front-end 422, which basically includes filtering and amplification of the baseband signal. If the received RF signals are down-converted into the IF band, the baseband signal processing chain of the analog front-end 422 may be referred to as an IF signal processing chain. Thus, the processing chain of the analog front-end 422 may, in general, be referred to as an analog signal processing chain.

The baseband signal is finally digitized using the ADC 423 and further processed in the digital domain at the digital front-end 424. The digital front-end 424 includes a digital signal processing chain implemented, for example, in a DSP.

The sequencer 430 (e.g., a sequencing circuit) may be configured to determine a sequencing scheme for time-dependent functions of the transmitter 410 and/or of the receive channel 420, and also to drive circuit elements of the transmit channel 411 and/or of the receive channel 420 in accordance with the sequencing scheme. A time-dependent function of the transmitter 410 and/or of the receive channel 420 may be a function which is to be performed or carried out in a manner temporally coordinated or synchronized with other time-dependent functions of the transmitter 410 and/or of the receive channel 420 in order to ensure correct operation of the radar sensor or radar system. Accordingly, the sequencing scheme represents a temporally coordinated or synchronized order of performance of individual time-dependent functions.

By way of example, the time-dependent functions may include a function of the transmit channel 411 relating to generating a radio-frequency radar transmission signal (e.g., a frequency-modulated ramp signal), a function of the receive channel 420 relating to processing a radio-frequency radar reception signal, a monitoring function for one or more circuit components of the transmit channel 411 and/or of the receive channel 420, a monitoring function for a signal processed by the transmit channel 411 and/or the receive channel 420, or a calibration of a transmit channel 411 and/or a receive channel 420. For example, the time-dependent function may include a transmit calibration function for calibrating the transmit channel 411, a receive calibration function for calibrating the receive channel 420, a transmit monitoring function for monitoring the transmit channel 411, a receive monitoring function for monitoring the receive channel 420, a ramp function for generating ramp segments of a frequency-modulated ramp signal (e.g., of a radar signal), an event monitoring function for monitoring for a trigger event, a read function to read data from a read memory location of the radar MMIC 106, or a write function to write data to a write memory location of the radar MMIC 106.

The sequencer 430 can be implemented, for example, as a dedicated circuit or as a circuit for executing software (e.g., a sequencing program), and configured to determine the sequencing scheme and to drive circuit elements of the transmitter 410 and/or of the receive channel 420 in accordance with the sequencing program. Thus, the sequencing program may be programmed with the sequencing scheme. In some implementations, the sequencer 430 may be referred to as a digital timing engine, a timing control engine, or a timing controller.

In some implementations, the sequencer 430 may include a decoder and a set of first-in first-out (FIFO) buffers. The decoder may be configured to read the sequencing program (e.g., a specific instruction set including a set of opcodes associated with operating the radar device) from a sequencer memory of the sequencer 430, and generate control values and timestamps based at least in part on the sequencing program. A control value may be a value that is to be provided as an input to a component of the radar MMIC 106 at a time indicated by a corresponding timestamp. The component may be any on-chip component of the radar MMIC 106, including but not limited to the transmit channel 411, the receive channel 420, the monitoring circuit 440, and/or the ramp signal generator 450. The control value (and, optionally, the timestamp) may be stored by a FIFO buffer associated with the component, and the FIFO buffer may be configured to provide the control value as the input to the component of the radar MMIC 106 at the time indicated by the timestamp.

In some implementations, the sequencer 430 may include a processing unit, such as a CPU, configured to read the sequencing program from the sequencer memory and execute the sequencing program. Thus, the sequencer 430 may include a memory (e.g., the sequencer memory) that stores the sequencing program for execution by the dedicated circuit and/or by the processing unit.

Radar operations of the at least one transmit channel 411 and/or of the at least one receive channel 420 are controlled centrally by the sequencer 430. Accordingly, the radar operations can be performed substantially autonomously, including independently of external controllers, on account of the sequencing program executed by the sequencer 430.

Furthermore, a frequency-modulated ramp signal includes a plurality of successive signal sections. Configuration ramp parameters for a ramp command may include frequency parameters for the respective signal section indicating a start frequency $f_{START}$, a stop frequency $f_{STOP}$, a time interval $T_{CHIRP}$, phase parameters indicating a phase setting for the transmit signals, a slope of a frequency ramp, and/or a duration of a pause (e.g., a duration of a wait time interval of a wait ramp segment) between adjacent signal sections. By way of example, a signal section can correspond to a ramp segment of a frequency ramp of the radar signal. Some ramp segments may be frequency ramps with a rising frequency (up-ramp) or a falling frequency (down-ramp). Whether a ramp segment is an up-ramp or a down-ramp may be implied by the start frequency and the stop frequency or may be indicated by a configuration parameter.

The radar MMIC 106 can be used, for example, for a (phase- or frequency-) modulated continuous wave radar system. Accordingly, a transmit channel 411 and/or a receive channel 420 can be part of a modulated continuous wave radar system, for example, of an FMCW radar in the automotive field. The sequencer 430 can accordingly be understood as a central sequencing unit which can coordinate substantial time-critical functions of the automotive FMCW radar front-end, such that a radar operation is an autonomous process which, for example, does not necessitate the participation of an external processor for performing the time-critical functions.

In addition to controlling a desired frequency profile of a radar transmission signal, the sequencer 430 can control various other aspects of a radar sensor or radar system in a synchronized manner.

By way of example, in the transmitter 410, and specifically in a transmit channel 411, a power amplifier can be switched on and off in a synchronized manner, or a phase shift (implemented by a phase shifter) of radar transmission signals can be carried out in a synchronized manner.

The monitoring of a transmit channel 411 and/or of a receive channel 420 can be carried out by a monitoring circuit 440. The latter can accordingly be driven by the sequencer 430 to trigger or to activate or deactivate a channel monitoring function in a synchronized manner in accordance with the sequencing scheme. By way of example, monitoring functions can be activated or deactivated in a synchronized manner during a ramp formation, during a calibration (e.g., amplification of a voltage-controlled oscillator), during a cascaded operation, or during a configuration of external components or slaves (e.g., via an SPI or demultiplexing). The monitoring circuit 440 may monitor the receive channel 420. In some implementations, monitoring the receive channel 420 may include monitoring for and detecting interference (e.g., interfering signals or interference signals), for example, from another radar device. In some implementations, monitoring the receive channel 420 may include providing data to the MCU 405, which may monitor for and detect interference based on the data. In some implementations, the sequencer 430 may receive an indicator from the monitoring circuit 440 or the MCU 405 indicating that interference has been detected.

The ramp signal generator 450 may include a local oscillator configured to generate the frequency-modulated ramp signal based on control values received from the sequencer 430. The control values may be used to set one or more ramp parameters described herein and implemented by the ramp signal generator 450 to generate the frequency-modulated ramp signal. For example, the ramp parameters implemented by the ramp signal generator 450 may include at least one of a ramp start frequency $f_{START}$ of the frequency-modulated ramp signal, a ramp stop frequency $f_{STOP}$ of the frequency-modulated ramp signal, a ramp frequency difference of the frequency-modulated ramp signal, a ramp time interval of the frequency-modulated ramp signal (e.g., time interval $T_{CHIRP}$), and/or a ramp wait time interval of the frequency-modulated ramp signal.

In the ramp signal generator 450, in a synchronized manner, for example, a bandwidth of a phase-locked loop (PLL) can be set (e.g., charge pump current) or more extensive modulation concepts can be activated or deactivated (e.g., 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g., offset current, anti-backlash, amplification of a voltage-controlled oscillator) can be set, or a signal source (e.g., when using a plurality of PLLs) can be selected.

In the receiver 421, in a synchronized manner, by way of example, digital or analog filters can be set (resetting, configuration, bypass, etc.) or decimation rates can be set. Low voltage differential signaling (LVDS) modes or calibrations can be chosen in a synchronized manner. Likewise, in a synchronized manner, the receive channel 420 can also be activated or deactivated in its entirety, or a reception frame delay can be set. By way of example, the ADC 423 can also be configured, calibrated, activated, or deactivated in a synchronized manner.

Likewise, general purpose inputs/outputs (GPIOs) can be configured in a synchronized manner, circuit components for generating frequency ramps can be triggered, or diverse circuit components (e.g., ADC 423) can be switched on or off. Moreover, interrupts can be generated or other chip functionality can be triggered.

In order to synchronize the time-dependent functions presented by way of example above, the sequencer 430 can include an instruction-processing unit (not shown) with a specific instruction set for determining the sequencing scheme. The instruction set can describe the configuration flow over time and be, for example, similar to the instruction set of a general-purpose processor. By way of example, the instruction set can include first specific instructions for the configuration of the circuit elements of a transmit channel 411 and/or of a receive channel 420, and second specific instructions for the configuration of frequency parameters of a radio-frequency radar transmission signal generated by the transmit channel 411.

The sequencer 430 can thus be understood as a radar-specific sequencing unit having an instruction set associated with a specific purpose in order to handle time-critical configurations in a highly integrated radar chip.

A controller/MMIC interface 460 shown in FIG. 4 can additionally be used to transmit commands and responses between the MCU 405 and the sequencer 430 via a communication channel or a communication bus, such as an SPI, an LVDS, or another type of communication interface.

A power supply unit 470 supplies power to the chip components and may be configurable by the sequencer 430.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5:
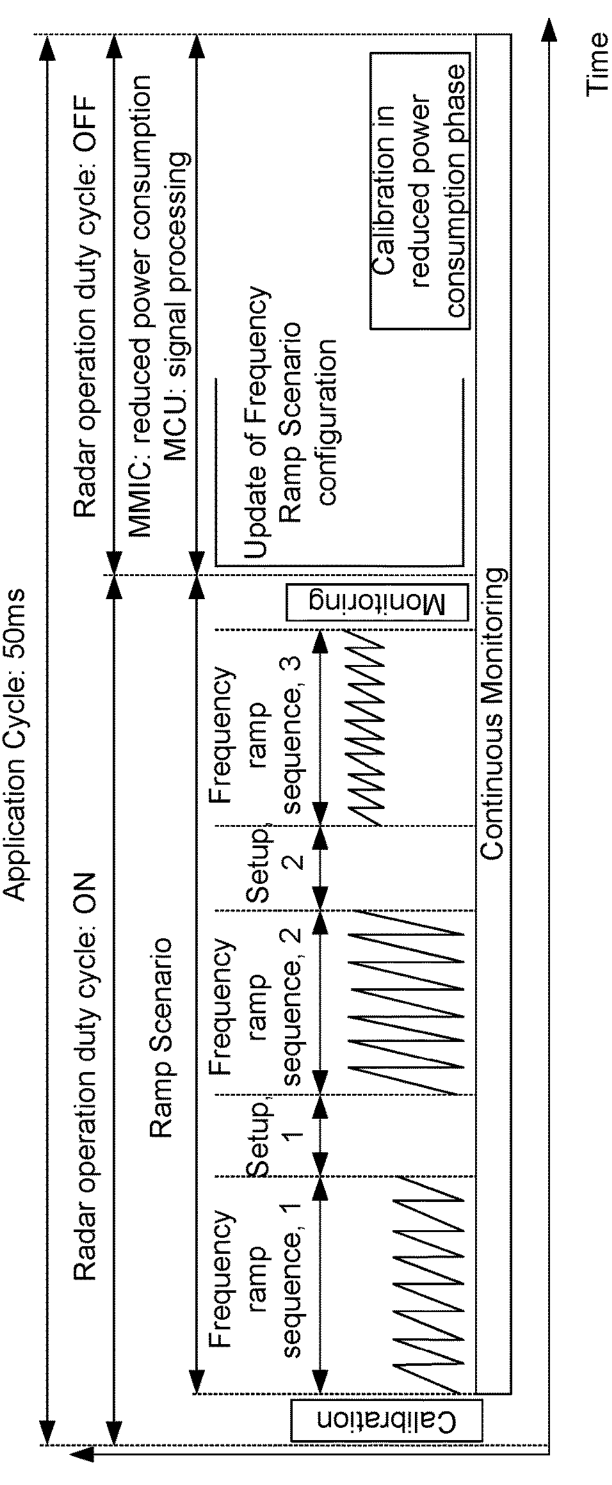
FIG. 5 illustrates an example application cycle according to one or more implementations.

FIG. 5 illustrates an example application cycle 500 according to one or more implementations. The application cycle 500 may include a radar operation duty cycle, including an ON period and an OFF period. During the ON period, the radar MMIC 106 may be configured to perform a warm-up calibration before running a ramp scenario defined by a programming context. In addition, during the ON period, the radar MMIC 106 is configured to perform a ramp scenario during which multiple frequency ramp sequences (e.g., frequency ramp sequence 1, frequency ramp sequence 2, and frequency ramp sequence 3) are transmitted according to ramp parameters defined in associated data of a programming context. In this example, the frequency ramp sequences are generated according to different sets of ramp parameters. Different ramp opcodes in the sequencing program may define the ramp parameters of the frequency ramp sequences. Consecutive frequency ramp sequences may be separated by a long wait ramp segment during which the frequency ramps are not generated (e.g., the frequency of the frequency-modulated ramp signal is held constant).

A setup operation (e.g., setup 1 and setup 2) may be performed by the radar MMIC 106 between frequency ramp sequences (e.g., during the long wait ramp segment). A setup operation may be used to change one or more ramp parameters or may be used to perform a calibration between the frequency ramp sequences.

In addition, during the ON period, the radar MMIC 106 may be configured to perform monitoring for reflected radar signals. During the OFF period, the radar MMIC 106 may continue to monitor for reflected radar signals but may no longer transmit radar signals. As a result, during the OFF period, the radar MMIC 106 may be configured into a reduced power consumption mode. During the OFF period, the MCU 405 may process, via signal processing, the results of the monitoring provided by the radar MMIC 106.

The application cycles may differ in the following ways: by a type of calibration and monitoring that are performed, and which ramp scenario is used. Ramp scenarios include frequency ramp sequences that further include a ramp set (e.g., shown as a triangular waveform). The ramp set may differ in terms of start frequency $f_{START}$, frequency ramp slope, stop frequency $f_{STOP}$, ramp start time $T_{START}$, time interval $T_{CHIRP}$, transmission power, and transmission phase. Additionally, if there are multiple transmit channels, a ramp set may be defined according to which transmit channel is specified for transmitting the ramp set.

As indicated above, FIG. 5 is provided as an example. Other examples may differ from what is described with regard to FIG. 5.

Figure 6:
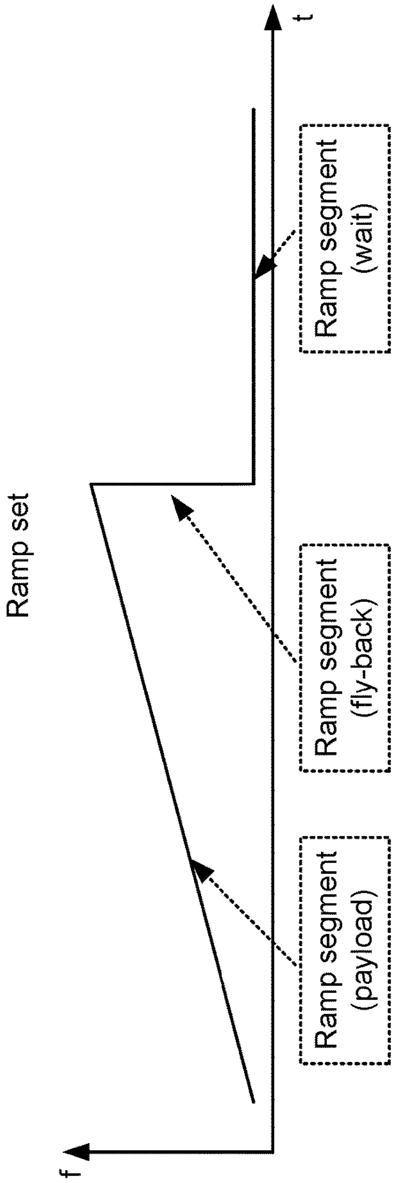
FIG. 6 illustrates an example ramp set according to one or more implementations.

FIG. 6 illustrates an example ramp set 600 according to one or more implementations. A sequence of frequency ramps may be made up of a plurality of ramp sets, with each ramp set corresponding to a respective frequency ramp. Each ramp set 600 of a frequency-modulated ramp signal may include two or more ramp segments, including a payload segment (e.g., the ramp) and a flyback segment during which the frequency transitions from the stop frequency to a wait frequency or to a next start frequency. One or more ramp sets may also include a wait segment that spans a wait interval between successive ramp sets at the wait frequency. An instruction set provided by the sequencing program and read by the sequencer 430 may be used to describe the ramp configuration over time. The instruction set may include specific instructions for each segment of each ramp set of a sequence of ramps. The specific instructions can be embodied as operation codes (opcodes) in the sequencing program. Operation codes directed to controlling one or more ramp parameters may be referred to as ramp opcodes. By way of example, the instruction set can include first specific instructions for the configuration of the circuit elements of a transmit channel and/or of a receive channel and also second specific instructions for the configuration of frequency parameters of a radar transmission signal (i.e., a ramp signal) generated by a ramp sequence generator.

In some implementations, an opcode may define control values for the payload segment, the flyback segment, and/or the wait segment. For example, the control values may correspond to ramp parameter values. In some implementations, one set of opcodes (e.g., one or more opcodes) may be directed to the payload segment of the frequency ramps, one set of opcodes may be directed to the flyback segment of the frequency ramps, and one set of opcodes may be directed to the wait segment of the frequency ramps, with various ramp parameters within each ramp segment being configured according to a respective opcode segment. Loops, including nested loops, may be used to define parameter sets that are performed a predetermined number of times before advancing to a new parameter set. Even more complex segment scenarios are possible—for example, a second payload instead of the flyback segment, or two (or more) payload segments, with or without wait segments between them, followed by one flyback covering all payload segments are also possible.

As indicated above, FIG. 6 is provided as an example. Other examples may differ from what is described with regard to FIG. 6.

Figure 7:
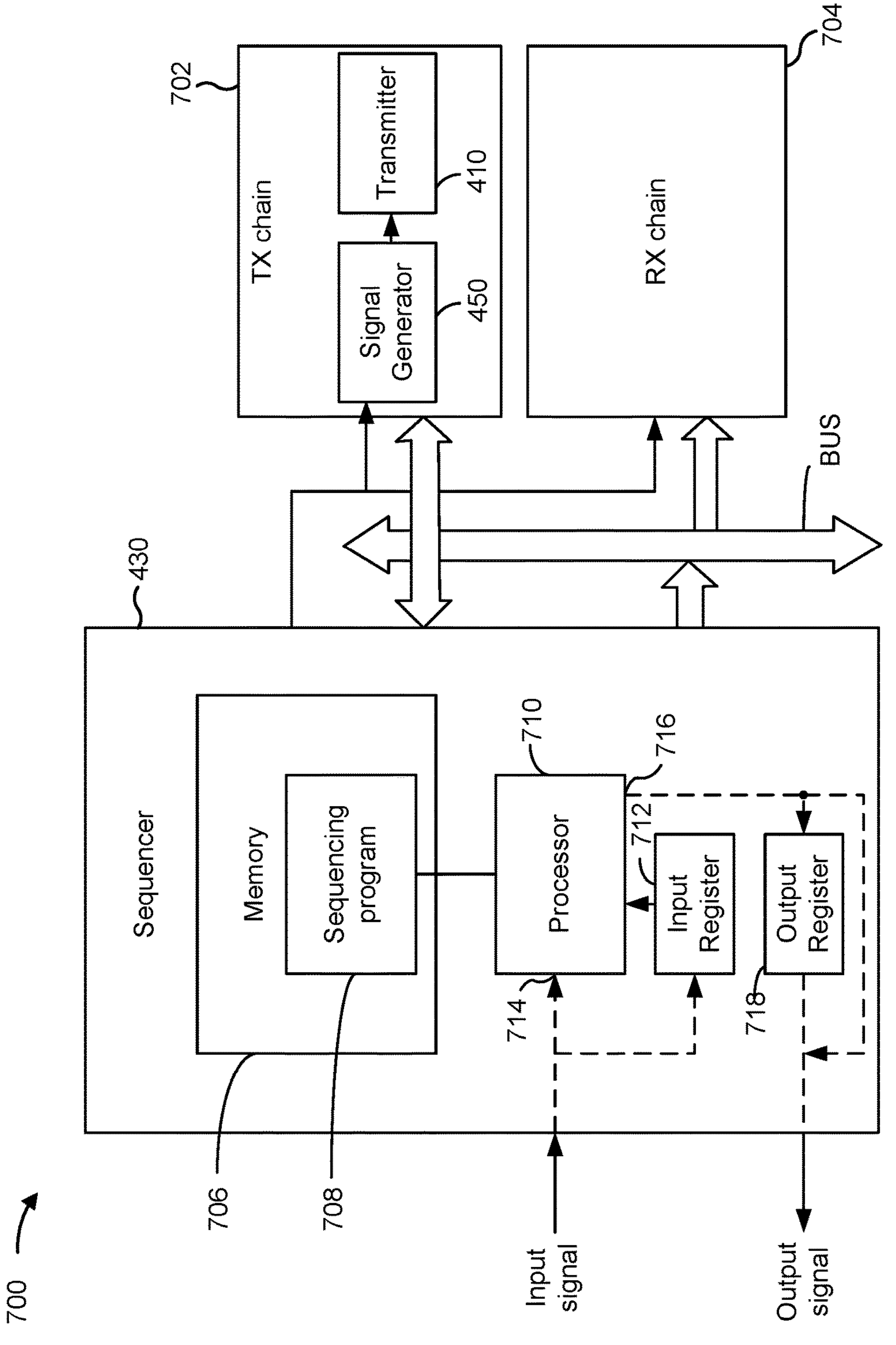
FIG. 7 illustrates a sequencing system according to one or more implementations.

FIG. 7 illustrates a sequencing system 700 according to one or more implementations. The sequencing system 700 may be integrated in the radar MMIC 106. The sequencing system 700 may include the sequencer 430, a TX chain 702, and an RX chain 704 that are coupled by a bus. The TX chain 702 may include the ramp signal generator 450 and components of the transmitter 410 (e.g., components of at least one transmit channel 411). The RX chain 704 may include components of the receive channel 420.

The ramp signal generator 450 may be configured to generate a frequency-modulated ramp signal that includes a plurality of frequency ramps of a ramp scenario. The ramp signal generator 450 may be configured to generate the plurality of frequency ramps according to a plurality of ramp parameters. For example, the ramp scenario may include at least two consecutive portions, including a first portion and a second portion that are demarked by a decision point. The first portion may include at least one first frequency ramp defined by a first value of a ramp parameter, and the second portion may include at least one second frequency ramp defined by a second value of the ramp parameter or by a third value of the ramp parameter that is different from the second value of the ramp parameter. The ramp parameter may be any one of the plurality of ramp parameters. Furthermore, the first value of the ramp parameter and the second value of the ramp parameter may be the same value. In some implementations, the first portion may include a first plurality of frequency ramps defined by the first value of a ramp parameter, and the second portion may include a second plurality of frequency ramps defined by the second value of the ramp parameter or by the third value of the ramp parameter. Additionally, the ramp signal generator 450 may be configured to generate each frequency ramp with a predetermined time dependency relative to each other frequency ramp of the plurality of frequency ramps. In other words, each frequency ramp may be a time-dependent function that has a predetermined time dependency relative to each other frequency ramp (e.g., each other time-dependent function) of the plurality of frequency ramps.

The plurality of ramp parameters may include at least one of a ramp start frequency of the frequency-modulated ramp signal, a ramp stop frequency of the frequency-modulated ramp signal, a ramp frequency difference of the frequency-modulated ramp signal, a ramp time interval of the frequency-modulated ramp signal, a ramp wait time interval of the frequency-modulated ramp signal, a phase of the frequency-modulated ramp signal, a phase offset of the frequency-modulated ramp signal, a signal output power of the frequency-modulated ramp signal, a filter configuration of a radar circuit component of the radar semiconductor chip, a gain configuration of a radar circuit component of the radar semiconductor chip, a power amplifier configuration of a radar circuit component of the radar semiconductor chip, a sampling start time of a radar circuit component of the radar semiconductor chip, a monitoring configuration of a radar circuit component of the radar semiconductor chip, a chip pin output configuration of the radar semiconductor chip, or data acquisition information of a radar circuit component of the radar semiconductor chip.

The sequencer 430 may include a memory 706. Alternatively, the memory 706 may be separate from the sequencer 430 and the sequencer 430 may access the memory 706 via the bus. The memory 706 may be configured to store a sequencing program 708 associated with generating the frequency-modulated ramp signal. For example, the sequencing program 708 may include a plurality of ramp opcodes that defines the plurality of frequency ramps and a decision point opcode configured to trigger an evaluation by the sequencer 430 of whether or not an indicator has been received prior to a corresponding decision point. In some implementations, the sequencing program 708 may include two or more decision point opcodes. Each ramp opcode of the plurality of ramp opcodes may define a respective timing for a respective frequency ramp such that the predetermined time dependency for each frequency ramp relative to the other frequency ramps of the plurality of frequency ramps is maintained. The predetermined time dependencies may be fixed or pre-programmed according to a sequencing program 708.

The sequencer 430 may include a processor 710 configured to read and execute the sequencing program 708. In some implementations, the processor 710 may be a controller or part of a controller. In addition, the processor 710 may monitor for an indicator and generate one or more output signals. The indicator may be provided by an input signal received at an input terminal from the monitoring circuit 440 or from the MCU 405 via the controller/MMIC interface 460. In some implementations, the indicator is an interference indicator that indicates whether interference has been detected in an environment. The interference may be detected by the MCU 405 or by the monitoring circuit 440.

The processor 710 may control the ramp signal generator 450 to generate the at least one second frequency ramp with the second value of the ramp parameter, based on the indicator not being received prior to the decision point. Additionally, the processor 710 may control the ramp signal generator 450 to generate the at least one second frequency ramp with the third value of the ramp parameter, based on the indicator being received prior to the decision point.

The processor 710 may monitor for the indicator during generation of the at least one first frequency ramp by the ramp signal generator. In other words, the processor 710 may monitor for the indicator during execution of the ramp scenario. The ramp scenario may correspond to a single radar frame of a radar operation. Upon reaching the decision point, the processor 710 may evaluate, at the decision point, whether or not the indicator has been received prior to the decision point. In some implementations, the processor 710 may evaluate, at the decision point, whether or not the indicator has been received during a monitoring time interval of the first portion of the ramp scenario.

The processor 710 may execute the sequencing program 708 associated with generating the frequency-modulated ramp signal. The sequencing program 708 may include at least one first ramp opcode that defines the at least one first frequency ramp having the first value of the ramp parameter, at least one second ramp opcode that defines the at least one second frequency ramp having the second value of the ramp parameter, and at least one third ramp opcode that defines the at least one third frequency ramp having the third value of the ramp parameter. The processor 710 may read the sequencing program 708, derive first control values for the at least one first frequency ramp based on the at least one first ramp code, and provide the first control values to the ramp signal generator 450 for generating the at least one first frequency ramp. The processor 710 may derive, based on the indicator not being received prior to the decision point, second control values for the at least one second frequency ramp based on the at least one second ramp code, and provide the second control values to the ramp signal generator 450 for generating the at least one second frequency ramp. Additionally, the processor 710 may derive, based on the indicator being received prior to the decision point, third control values for the at least one second frequency ramp based on the at least one third ramp code, and provide the third control values to the ramp signal generator 450 for generating the at least one second frequency ramp. Furthermore, when the processor 710 reaches the decision point opcode in the sequencing program 708, the decision point opcode is configured to trigger an evaluation by the processor 710 of whether or not the indicator has been received prior to the decision point. Thus, the processor 710 may evaluate whether or not the indicator has been received prior to the decision point in response to reading the decision point opcode in the sequencing program 708.

In some implementations, the processor 710 may control the ramp signal generator 450 to generate the at least one second frequency ramp with the second value of the ramp parameter, based on the indicator not being received within the monitoring time interval of the first portion of the ramp scenario. Additionally, the processor 710 may control the ramp signal generator 450 to generate the at least one second frequency ramp with the third value of the ramp parameter, based on the indicator being received within the monitoring time interval of the first portion of the ramp scenario.

In some implementations, the sequencer 430 may include or may be coupled to an input register 712 that stores a register value that indicates whether or not the indicator has been received prior to the decision point in order to determine whether the second value or the third value of the ramp parameter should be used for the second portion of the ramp scenario. For example, the input register 712 may be a single bit register that has a bit value (e.g., 0 or 1) to indicate whether or not the indicator has been received prior to the decision point. The processor 710 may evaluate the register value at the decision point, for example, in response to reading the decision point opcode. In some implementations, the input register 712 may be a multibit register that has a multibit register value to indicate whether or not the indicator has been received prior to the decision point, and to indicate which predefined branch or option to select. For example, a first register value may indicate that the indicator has not been received, whereas a second register value, a third register value, and a fourth register value may indicate that the indicator has been received. In addition, the second register value may correspond to a first predefined branch or a first option, the third register value may correspond to a second predefined branch or a second option, and the third register value may correspond to a third predefined branch or a third option. The processor 710 may select or otherwise derive one or more control values corresponding to a particular predefined branch or option indicated by the register value.

In some implementations, an input terminal 714 may be configured to receive the indicator as an input signal having a signal value that indicates whether or not the indicator has been received prior to the decision point. The processor 710 may evaluate the signal value at the decision point in order to determine whether the second value or the third value of the ramp parameter should be used for the second portion of the ramp scenario.

In some implementations, the input terminal 714 may receive an input signal having a signal value that indicates whether the second value or the third value of the ramp parameter should be used. For example, the processor 710 may be coupled to the MCU 405 for receiving the input signal. The processor 710 may evaluate the signal value at the decision point in order to determine whether the second value or the third value of the ramp parameter should be used for the second portion of the ramp scenario.

In some implementations, an output terminal 716 may be configured to provide an output signal to the MCU 405 in order to indicate to the MCU 405 a monitoring time interval during which the indicator is valid for the decision point. In other words, in a case where the MCU transmits the indicator to the sequencer 430, the output signal may be used to notify the MCU 405 of a time period during which transmission of the indicator is permitted. For example, the processor 710 may need a sufficient amount of time prior to the decision point to receive and process the indicator, as well as to implement a change in the ramp parameter value, if needed. Thus, the monitoring time interval may define a cut-off time prior to the decision point, after which the processor 710 may disregard the indicator for the upcoming decision point. A timing of implementing the change in the ramp parameter value at the decision point may be critical for maintaining a timing for each frequency ramp of the ramp scenario such that a predetermined time dependency for each frequency ramp of the ramp scenario, relative to each other frequency ramp of the ramp scenario, is preserved. Thus, the monitoring time interval may be used to ensure that the change in the ramp parameter value can be performed at the decision point and not later than the decision point.

Additionally, or alternatively, the output terminal 716 may be configured to provide an output signal that indicates whether the second value or the third value of the ramp parameter has been implemented for the at least one second frequency ramp. The output terminal 716 may provide the output signal to the MCU 405. Thus, the sequencer 430 is able to notify the MCU 405 which ramp parameter value is being used for the second portion of the ramp scenario based on the decision made at the decision point. As a result, the MCU 405 is able to correctly process radar data received from the radar MMIC 106 by using the appropriate ramp parameter value indicated by the output signal. In some implementations, the sequencer 430 may include or may be coupled to an output register 718 that stores a register value that indicates whether the second value or the third value of the ramp parameter has been implemented. For example, different bit values at the output register 718 may be used to indicate the second value or the third value of the ramp parameter. The MCU 405 may be configured to read the output register 718 to determine whether the second value or the third value of the ramp parameter has been implemented for the at least one second frequency ramp. The output register 718 may be a single bit register or a multibit register, depending on how many options are to be communicated to the MCU 405.

As indicated above, FIG. 7 is provided as an example. Other examples may differ from what is described with regard to FIG. 7. The number and arrangement of devices and components shown in FIG. 7 are provided as an example. In practice, there may be additional devices or components, fewer devices or components, different devices or components, or differently arranged devices or components than those shown in FIG. 7. Furthermore, two or more devices or components shown in FIG. 7 may be implemented within a single device or component, or a single device or component shown in FIG. 7 may be implemented as multiple, distributed devices or components. Additionally, or alternatively, a set of devices or components (e.g., one or more devices or components) shown in FIG. 7 may perform one or more functions described as being performed by another set of devices or components shown in FIG. 7.

Figures 8A, 8B:
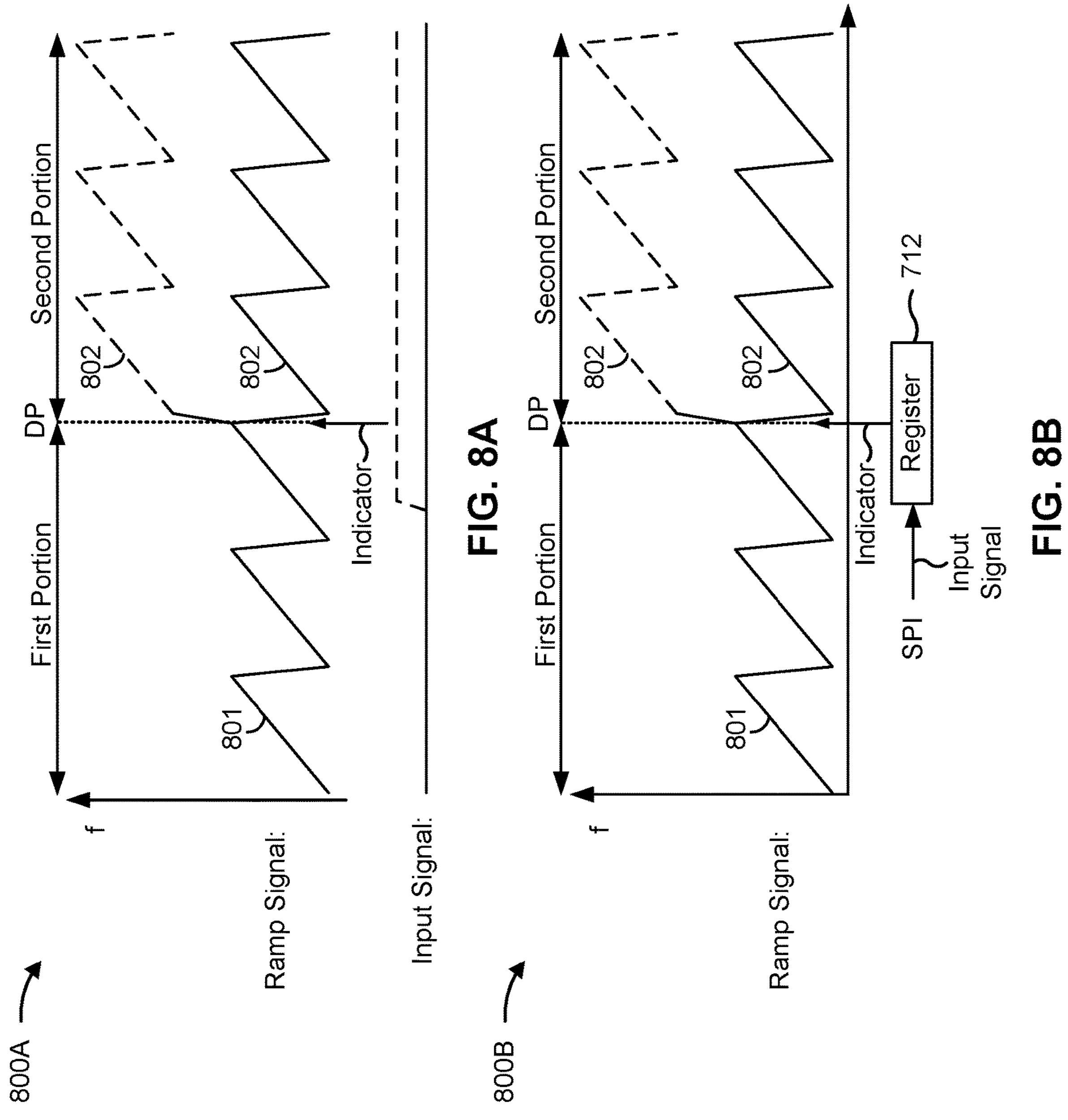
FIG. 8A illustrates a signal diagram according to one or more implementations.
FIG. 8B illustrates a signal diagram according to one or more implementations.

FIG. 8A illustrates a signal diagram 800A according to one or more implementations. The signal diagram 800A shows a frequency-modulated ramp signal and an indicator (e.g., an input signal). The frequency-modulated ramp signal includes a first portion and a second portion that are demarked by a decision point DP. The first portion and the second portion are consecutive portions of a ramp scenario. The first portion includes at least one first frequency ramp 801 defined by a first value of a ramp parameter. The second portion includes at least one second frequency ramp 802 defined by a second value of the ramp parameter or by a third value of the ramp parameter that is different from the second value of the ramp parameter. For example, the ramp parameter may be a start frequency $f_{START}$. The first value and the second value may be set to a same start frequency value, whereas the third value may be shifted up from the first value and the second value. As a result, an entire frequency band of the at least one second frequency ramp 802 may be shifted based on whether the second value or the third value is used for the start frequency $f_{START}$. If no interference is detected, the frequency ramps may remain unchanged. However, if interference is detected, the frequency ramps may change to avoid the interference. The sequencer 430 may evaluate the signal value of the input signal at the decision point.

As indicated above, FIG. 8A is provided as an example. Other examples may differ from what is described with regard to FIG. 8A.

FIG. 8B illustrates a signal diagram 800B according to one or more implementations. The signal diagram 800B shows a frequency-modulated ramp signal and an indicator from the input register 712. The sequencer 430 may evaluate the register value of the input register 712 at the decision point.

As indicated above, FIG. 8B is provided as an example. Other examples may differ from what is described with regard to FIG. 8B.

Figures 8C, 8D:
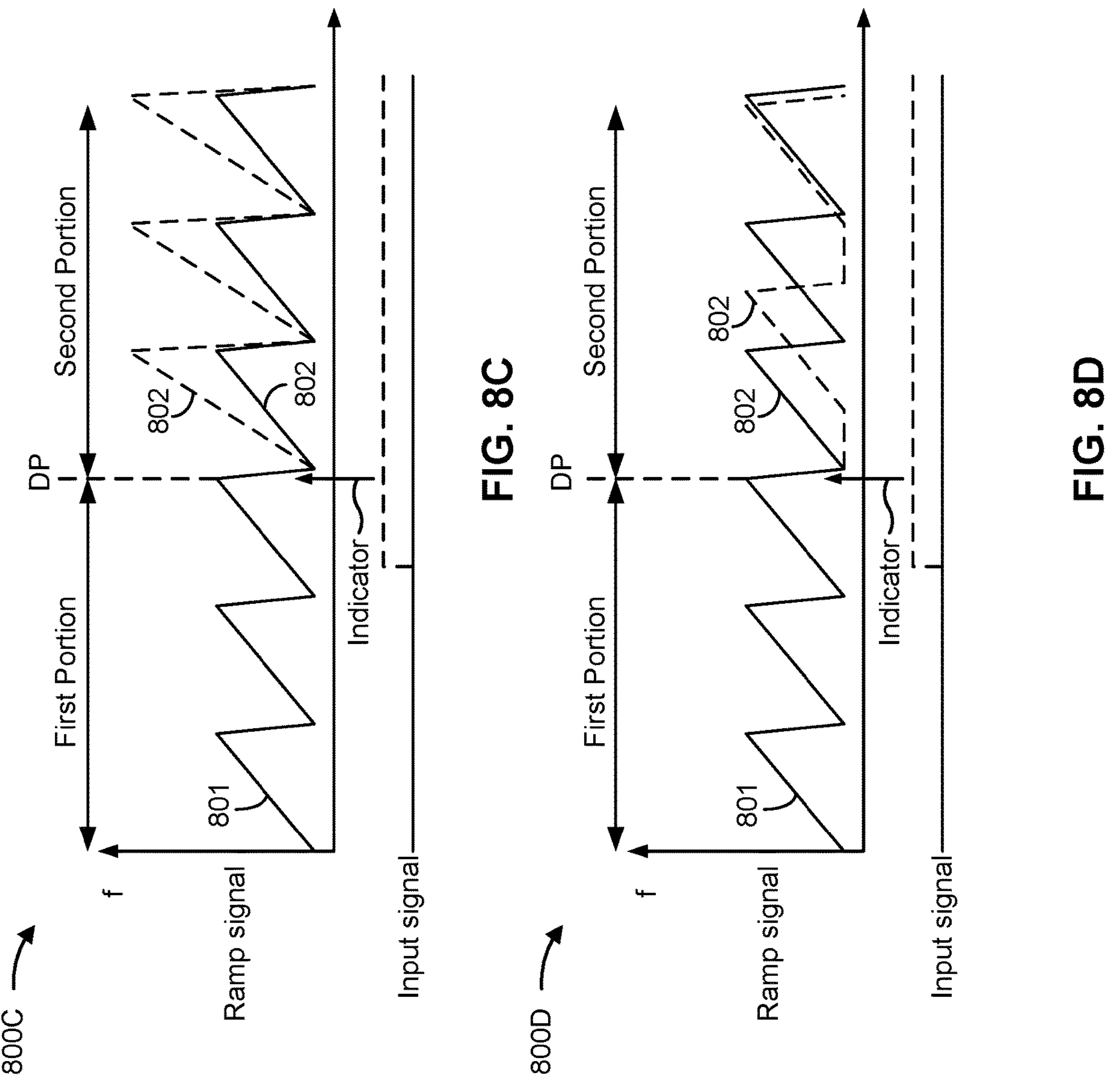
FIG. 8C illustrates a signal diagram according to one or more implementations.
FIG. 8D illustrates a signal diagram according to one or more implementations.

FIG. 8C illustrates a signal diagram 800C according to one or more implementations. The signal diagram 800C shows a frequency-modulated ramp signal and an indicator (e.g., an input signal). The frequency-modulated ramp signal is similar to the frequency-modulated ramp signal shown in FIG. 8A, with the exception that the ramp parameter may correspond to a stop frequency $f_{STOP}$. Thus, the second value and the third value may correspond to different stop frequency values.

As indicated above, FIG. 8C is provided as an example. Other examples may differ from what is described with regard to FIG. 8C.

FIG. 8D illustrates a signal diagram 800D according to one or more implementations. The signal diagram 800D shows a frequency-modulated ramp signal and an indicator (e.g., an input signal). The frequency-modulated ramp signal is similar to the frequency-modulated ramp signal shown in FIG. 8A, with the exception that the ramp parameter may correspond to a wait time interval. Thus, the second value and the third value may correspond to different wait time values. In some implementations, a first wait time interval following the decision point may be configurable based on the input signal, and subsequent wait time intervals may be maintained at the first value. By changing the first wait time interval, the second portion of the ramp scenario (e.g., the second plurality of frequency ramps) may be time shifted.

As indicated above, FIG. 8D is provided as an example. Other examples may differ from what is described with regard to FIG. 8D.

Figure 8E:
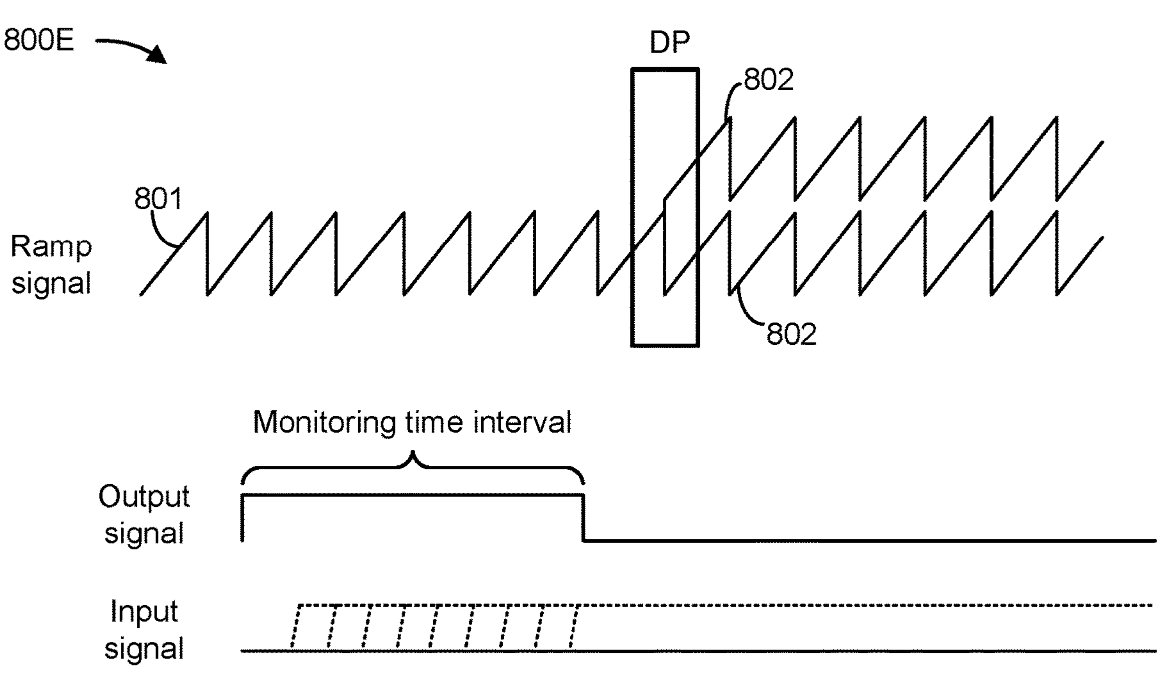
FIG. 8E illustrates a signal diagram according to one or more implementations.

FIG. 8E illustrates a signal diagram 800E according to one or more implementations. The signal diagram 800E shows a frequency-modulated ramp signal, an indicator (e.g., an input signal), and an output signal. The output signal defines a monitoring time interval during which the indicator is valid for the decision point. Thus, any toggling of the input signal during the monitoring time interval may be accepted by the processor 710 for changing the ramp parameter value at the decision point. In contrast, any toggling of the input signal outside of the monitoring time interval may be rejected by the processor 710.

As indicated above, FIG. 8E is provided as an example. Other examples may differ from what is described with regard to FIG. 8E.

Figure 8F:
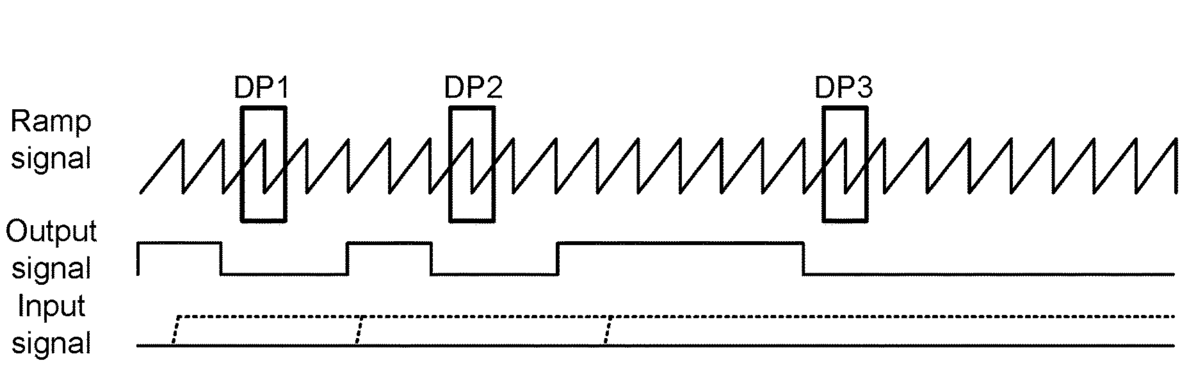
FIG. 8F illustrates a signal diagram according to one or more implementations.

FIG. 8F illustrates a signal diagram 800F according to one or more implementations. The signal diagram 800F shows a frequency-modulated ramp signal, an indicator (e.g., an input signal), and an output signal. There may be multiple decision points configured in the sequencing program 708, including a first decision point DP1, a second decision point DP2, and a third decision point DP3. The processor 710 may choose between two or more branches or options at each decision point based on an indicator evaluated at the decision point. In addition, the output signal may define a monitoring time interval for each decision point during which the indicator is valid for the respective decision point.

As indicated above, FIG. 8F is provided as an example. Other examples may differ from what is described with regard to FIG. 8F.

Figure 9A:
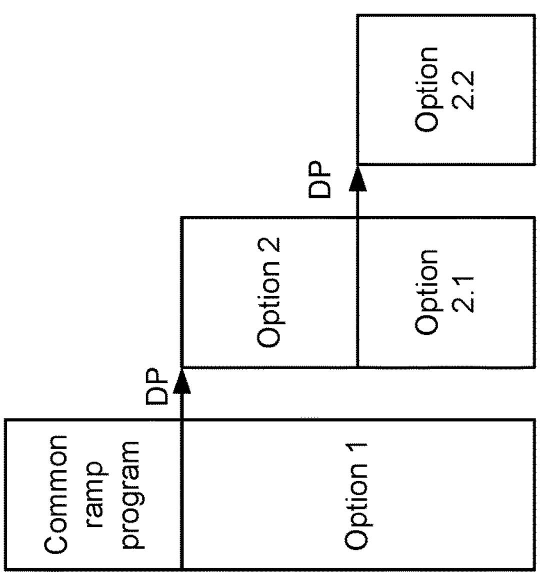
FIG. 9A illustrates a diagram of an execution flow of a sequencing program according to one or more implementations.
Figure 9A:

FIG. 9A illustrates a diagram 900A of an execution flow of a sequencing program according to one or more implementations. The sequencing program (e.g., sequencing program 708) may include a common ramp program and various options (e.g., options 1, 2, 2.1, 2.2, etc.) that are selected based on determinations made at each decision point.

As indicated above, FIG. 9A is provided as an example. Other examples may differ from what is described with regard to FIG. 9A.

Figure 9C:
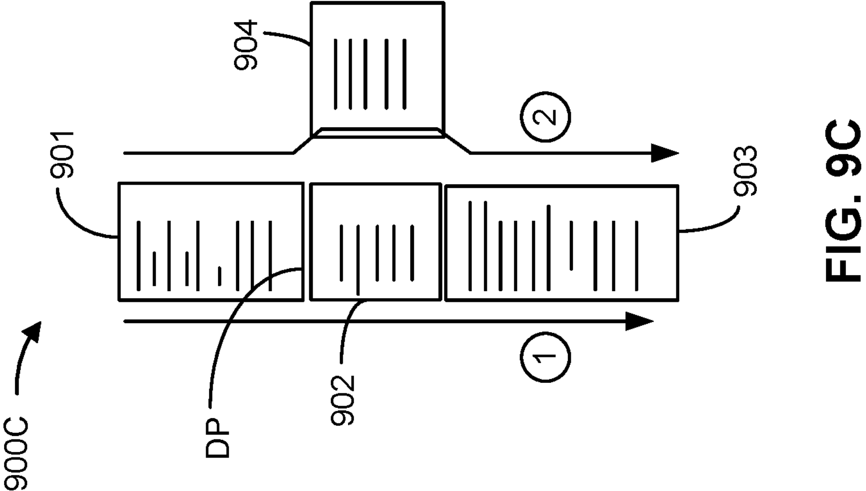
FIG. 9C illustrates a diagram of an execution flow of a sequencing program according to one or more implementations.
Figure 9B:
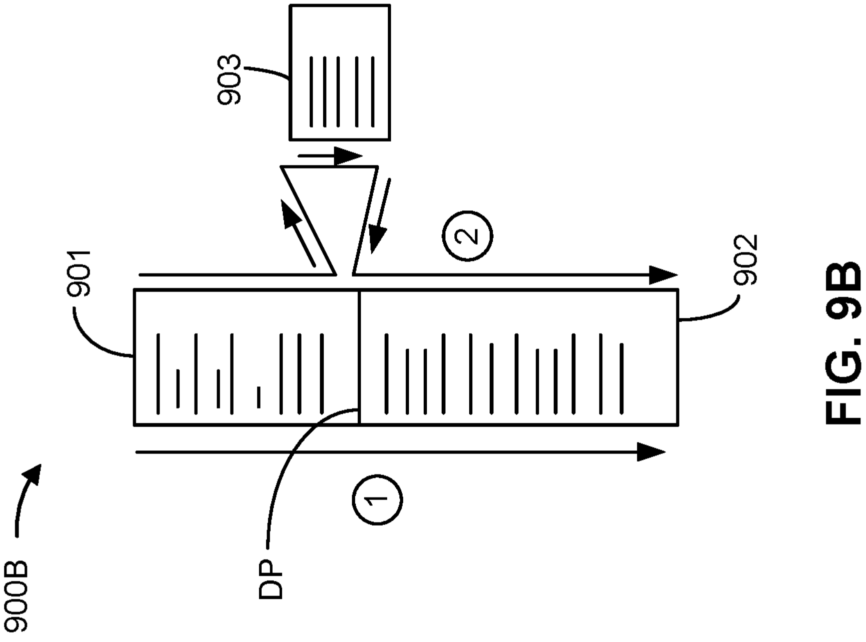
FIG. 9B illustrates a diagram of an execution flow of a sequencing program according to one or more implementations.

FIG. 9B illustrates a diagram 900B of an execution flow of a sequencing program according to one or more implementations. The sequencing program (e.g., sequencing program 708) may include a first segment of opcodes 901, a second segment of opcodes 902, and a third segment of opcodes 903. The sequencer 430 may start by executing the first segment of opcodes 901. The sequencer 430 may be configured to follow a first program path (1) based on the indicator not being received prior to the decision point DP. For example, the sequencer 430 may execute the second segment of opcodes 902 immediately after the decision point. Alternatively, the sequencer 430 may be configured to follow a second program path (2) based on the indicator being received prior to the decision point DP. For example, the sequencer 430 may execute the third segment of opcodes 903 immediately after the decision point DP, and then process the second segment of opcodes 902 after executing the third segment of opcodes 903.

As indicated above, FIG. 9B is provided as an example. Other examples may differ from what is described with regard to FIG. 9B.

FIG. 9C illustrates a diagram 900C of an execution flow of a sequencing program according to one or more implementations. The sequencing program (e.g., sequencing program 708) may include a first segment of opcodes 901, a second segment of opcodes 902, a third segment of opcodes 903, and a fourth segment of opcodes 904. The sequencer 430 may start by executing the first segment of opcodes 901. The sequencer 430 may be configured to follow a first program path (1) based on the indicator not being received prior to the decision point DP. For example, the sequencer 430 may execute the second segment of opcodes 902 immediately after the decision point, followed by executing the third segment of opcodes 903. Alternatively, the sequencer 430 may be configured to follow a second program path (2) based on the indicator being received prior to the decision point DP. For example, the sequencer 430 may execute the fourth segment of opcodes 904 immediately after the decision point DP, followed by executing the third segment of opcodes 903.

As indicated above, FIG. 9C is provided as an example. Other examples may differ from what is described with regard to FIG. 9C.

Figure 10:
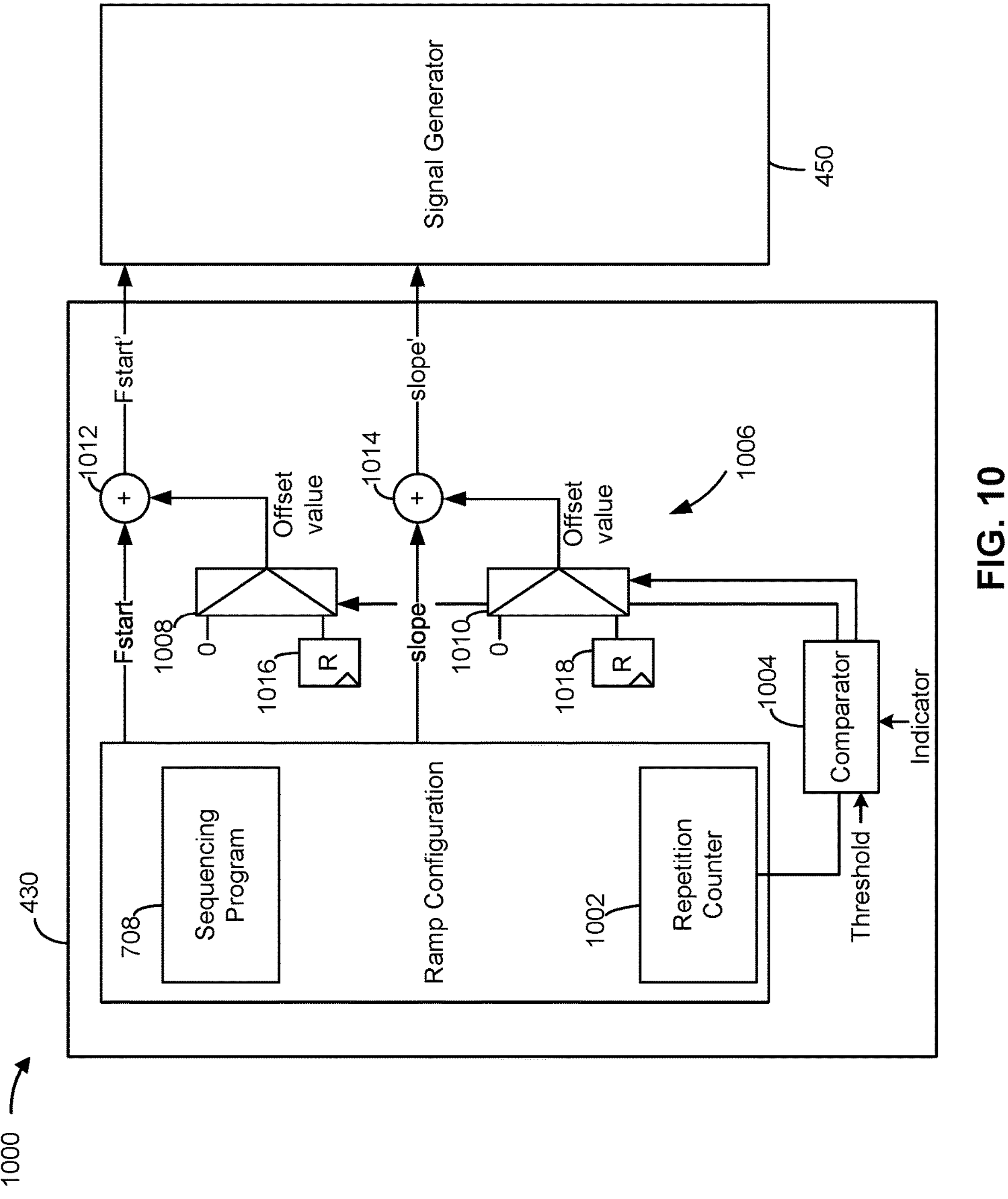
FIG. 10 illustrates a sequencing system according to one or more implementations.

FIG. 10 illustrates a sequencing system 1000 according to one or more implementations. The sequencing system 1000 may be integrated in the radar MMIC 106. The sequencing system 700 may include the sequencer 430 and the ramp signal generator 450. The sequencer 430 may execute the sequencing program 708 that defines a ramp configuration of a ramp scenario.

The sequencer 430 may include a repetition counter 1002, a comparator circuit 1004, and an offset circuit 1006. The offset circuit 1006 may include multiplexers 1008 and 1010, as well as summers 1012 and 1014 (e.g., adders). The offset circuit 1006 may be enabled or disabled to provide one or more offset values when enabled and to provide zero offset values when disabled.

The sequencer 430 may generate first control values for the first portion of the ramp scenario, and provide the first control values to the ramp signal generator 450 for generating the first portion of the ramp scenario (e.g., for the at least one first frequency ramp of the ramp scenario). For example, the first control values may include ramp parameter values for the start frequency $f_{START}$ and the frequency slope.

Additionally, sequencer 430 may generate second control values for the second portion of the ramp scenario (e.g., for the at least one second frequency ramp of the ramp scenario). The offset circuit 1006 may disabled based on the indicator not being received prior to the decision point, or enabled based on the indicator being received prior to the decision point. The offset circuit 1006 may be configured to, while disabled, provide the second control values to the ramp signal generator for generating the at least one second frequency ramp. In some implementations, the second control values may be the same as the first control values. Additionally, the offset circuit 1006 may be configured to, while enabled, generate third control values by modifying the second control values with at least one offset value, and provide the third control values to the ramp signal generator 450 for generating the at least one second frequency ramp.

The repetition counter 1002 may count a number of frequency ramps generated for the ramp scenario of the frequency-modulated ramp signal, and provide a counter value to the comparator circuit 1004. Thus, the repetition counter 1002 indicates how many frequency ramps in the ramp scenario have been generated. The comparator circuit 1004 may trigger a decision point in response to the number of frequency ramps satisfying a threshold. In other words, the threshold may correspond to a threshold number of frequency ramps that correspond to the decision point. In addition, the comparator circuit 1004 may receive the indicator. The comparator circuit 1004 may enable the offset circuit 1006 in response to the decision point being triggered and in response to the indicator being received prior to the decision point. For example, the indicator (e.g., indicating that interference has been detected) may enable an output of the comparator circuit 1004, which causes the multiplexers 1008 and 1010 to output respective offset values to the summers 1012 and 1014. The respective offset values may be values different than zero, including positive or negative values. In contrast, if the indicator is not received prior to the decision point, the output of the comparator circuit 1004 may remain disabled, which causes the multiplexers 1008 and 1010 to output values of zero to the summers 1012 and 1014. In some implementations, the comparator circuit 1004 may output a logic high value (e.g., a logic "1" value) when enabled, and a logic low value (e.g., a logic "0" value) when disabled. In some implementations, the offset circuit 1006 may include registers 1016 and 1018 that store the offset values and provide the offset values to the multiplexers 1008 and 1010, respectively. Thus, with the inclusion of the offset circuit 1006, the sequencing program 708 may be simplified. For example, the sequencing program 708 may include fewer opcodes than would otherwise be required for providing second control values and third control values.

In some implementations, the sequencer 430 (e.g., the processor 710) is configured to execute the sequencer program 708 associated with generating the frequency-modulated ramp signal. The sequencing program 708 may include at least one first ramp opcode that defines the at least one first frequency ramp having the first value of the ramp parameter, and at least one second ramp opcode that defines the at least one second frequency ramp having the second value of the ramp parameter. The sequencer 430 may read the sequencing program, derive first control values for the at least one first frequency ramp based on the at least one first ramp opcode, and provide the first control values to the ramp signal generator 450 for generating the at least one first frequency ramp. Additionally, the offset circuit 1006 may be disabled based on the indicator not being received prior to the decision point, or enabled based on the indicator being received prior to the decision point. The sequencer 430 may read the sequencing program 708, and derive second control values based on the at least one second ramp opcode. In addition, the offset circuit may, while disabled, provide the second control values to the ramp signal generator 450 for generating the at least one second frequency ramp, and, while enabled, generate third control values by modifying the second control values with at least one offset value, and provide the third control values to the ramp signal generator 450 for generating the at least one second frequency ramp. Thus, with the inclusion of the offset circuit 1006, the sequencing program 708 may be simplified.

As indicated above, FIG. 10 is provided as an example. Other examples may differ from what is described with regard to FIG. 10.

Figure 11:
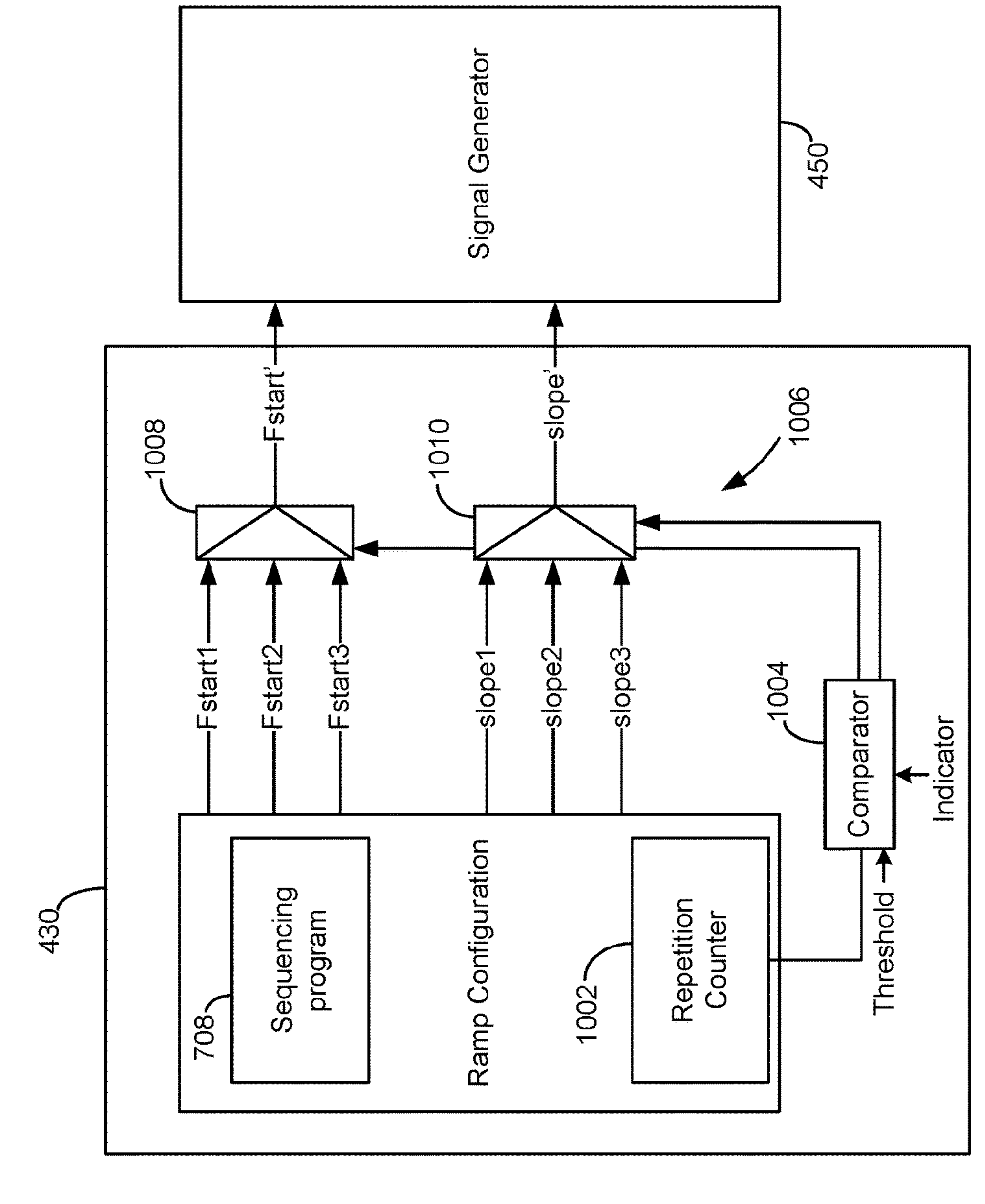
FIG. 11 illustrates a sequencing system according to one or more implementations.

FIG. 11 illustrates a sequencing system 1100 according to one or more implementations. The sequencing system 1100 may be integrated in the radar MMIC 106. The sequencing system 700 may include the sequencer 430 and the ramp signal generator 450. The sequencer 430 may execute the sequencing program 708 that defines a ramp configuration of a ramp scenario.

The sequencer 430 may include the repetition counter 1002, the comparator circuit 1004, and the offset circuit 1006. The offset circuit 1006 may include multiplexers 1008 and 1010 that selectively output control values. Thus, the multiplexers 1008 and 1010 may be used as a selection circuit. Each of the multiplexers 1008 and 1010 may receive two or more control values for a respective ramp parameter from the processor 710.

The selection circuit may output first control values (e.g., Fstart1 and slope1) for the first portion of the ramp scenario, and provide the first control values to the ramp signal generator 450 for generating the at least one first frequency ramp. The selection circuit may be configured to, based on the indicator not being received prior to the decision point, output second control values (e.g., Fstart2 and slope2) for the second portion of the ramp scenario, and provide the second control values to the ramp signal generator 450 for generating the at least one second frequency ramp. In some implementations, the second control values are the same as the first control values. Additionally, the selection circuit may be configured to, based on the indicator being received prior to the decision point, output third control values (e.g., Fstart3 and slope3) for the second portion of the ramp scenario, and provide the third control values to the ramp signal generator 450 for generating the at least one second frequency ramp.

The first control values may include the first value of the ramp parameter, the second control values may include the second value of the ramp parameter, and the third control values may include the third value of the ramp parameter, discussed above.

The repetition counter 1002 may count a number of frequency ramps generated for the ramp scenario of the frequency-modulated ramp signal, and provide a counter value to the comparator circuit 1004. Thus, the repetition counter 1002 indicates how many frequency ramps in the ramp scenario have been generated. The comparator circuit 1004 may trigger a decision point in response to the number of frequency ramps satisfying a threshold. In other words, the threshold may correspond to a threshold number of frequency ramps that correspond to the decision point. In addition, the comparator circuit 1004 may receive the indicator. The comparator circuit 1004 may indicate to the selection circuit (e.g., the multiplexers 1008 and 1010) which control values to select based on whether or not the indicator was received prior to the decision point. Thus, the selection circuit may select either the second control values or the third control values for output to the ramp signal generator 450 in response to the decision point being triggered, based on control signals from the comparator circuit 1004.

As indicated above, FIG. 11 is provided as an example. Other examples may differ from what is described with regard to FIG. 11.

The following provides an overview of some Aspects of the present disclosure:

Aspect 1: A radar semiconductor chip, comprising: a ramp signal generator configured to generate a frequency-modulated ramp signal comprising a ramp scenario, wherein the ramp scenario comprises at least two consecutive portions, including a first portion and a second portion that are demarked by a decision point, wherein the first portion includes at least one first frequency ramp defined by a first value of a ramp parameter, and wherein the second portion includes at least one second frequency ramp defined by a second value of the ramp parameter or by a third value of the ramp parameter that is different from the second value of the ramp parameter; and a sequencer configured to monitor for an indicator, wherein the sequencer is configured to control the ramp signal generator to generate the at least one second frequency ramp with the second value of the ramp parameter, based on the indicator not being received prior to the decision point, and wherein the sequencer is configured to control the ramp signal generator to generate the at least one second frequency ramp with the third value of the ramp parameter, based on the indicator being received prior to the decision point.

Aspect 2: The radar semiconductor chip of Aspect 1, wherein the sequencer is configured to monitor for the indicator during generation of the at least one first frequency ramp by the ramp signal generator.

Aspect 3: The radar semiconductor chip of any of Aspects 1-2, wherein the sequencer is configured to evaluate, at the decision point, whether or not the indicator has been received prior to the decision point.

Aspect 4: The radar semiconductor chip of any of Aspects 1-3, wherein the ramp scenario corresponds to a single radar frame of a radar operation.

Aspect 5: The radar semiconductor chip of any of Aspects 1-4, wherein the first value of the ramp parameter and the second value of the ramp parameter are the same.

Aspect 6: The radar semiconductor chip of any of Aspects 1-5, wherein the sequencer is configured to execute a sequencing program associated with generating the frequency-modulated ramp signal, wherein the sequencing program includes at least one first ramp opcode that defines the at least one first frequency ramp having the first value of the ramp parameter, at least one second ramp opcode that defines the at least one second frequency ramp having the second value of the ramp parameter, and at least one third ramp opcode that defines the at least one second frequency ramp having the third value of the ramp parameter, wherein the sequencer is configured to read the sequencing program, derive first control values for the at least one first frequency ramp based on the at least one first ramp opcode, and provide the first control values to the ramp signal generator for generating the at least one first frequency ramp, wherein the sequencer is configured to derive, based on the indicator not being received prior to the decision point, second control values for the at least one second frequency ramp based on the at least one second ramp opcode, and provide the second control values to the ramp signal generator for generating the at least one second frequency ramp, and wherein the sequencer is configured to derive, based on the indicator being received prior to the decision point, third control values for the at least one second frequency ramp based on the at least one third ramp opcode, and provide the third control values to the ramp signal generator for generating the at least one second frequency ramp.

Aspect 7: The radar semiconductor chip of any of Aspects 1-6, wherein the sequencer is configured to execute a sequencing program associated with generating the frequency-modulated ramp signal, wherein the sequencing program includes a decision point opcode corresponding to the decision point, wherein the decision point opcode is configured to trigger an evaluation by the sequencer of whether or not the indicator has been received prior to the decision point, and wherein the sequencer is configured to evaluate whether or not the indicator has been received prior to the decision point in response to reading the decision point opcode in the sequencing program.

Aspect 8: The radar semiconductor chip of any of Aspects 1-7, wherein the sequencer is configured to generate first control values for the first portion of the ramp scenario, and provide the first control values to the ramp signal generator for generating the first plurality of frequency ramps, wherein the sequencer is configured to generate second control values for the second portion of the ramp scenario, wherein the sequencer comprises an offset circuit configured to be disabled based on the indicator not being received prior to the decision point, or enabled based on the indicator being received prior to the decision point, wherein the offset circuit is configured to, while disabled, provide the second control values to the ramp signal generator for generating the at least one second frequency ramp, and wherein the offset circuit is configured to, while enabled, generate third control values by modifying the second control values with at least one offset value, and provide the third control values to the ramp signal generator for generating the at least one second frequency ramp.

Aspect 9: The radar semiconductor chip of Aspect 8, further comprising: a counter configured to count a number of frequency ramps generated for the ramp scenario of the frequency-modulated ramp signal; and a comparator circuit configured to trigger the decision point in response to the number of frequency ramps satisfying a threshold, wherein the comparator circuit is configured to enable the offset circuit in response to the decision point being triggered and in response to the indicator being received prior to the decision point.

Aspect 10: The radar semiconductor chip of any of Aspects 1-9, wherein the sequencer comprises a selection circuit configured to output first control values for the first portion of the ramp scenario, and provide the first control values to the ramp signal generator for generating the at least one first frequency ramp, wherein the selection circuit is configured to, based on the indicator not being received prior to the decision point, output second control values for the second portion of the ramp scenario, and provide the second control values to the ramp signal generator for generating the at least one second frequency ramp, and wherein the selection circuit is configured to, based on the indicator being received prior to the decision point, output third control values for the second portion of the ramp scenario, and provide the third control values to the ramp signal generator for generating the at least one second frequency ramp.

Aspect 11: The radar semiconductor chip of Aspect 10, wherein the first control values includes the first value of the ramp parameter, the second control values includes the second value of the ramp parameter, and the third control values includes the third value of the ramp parameter.

Aspect 12: The radar semiconductor chip of Aspect 10, further comprising: a counter configured to count a number of frequency ramps generated for the ramp scenario of the frequency-modulated ramp signal; and a comparator circuit configured to trigger the decision point in response to the number of frequency ramps satisfying a threshold, wherein the selection circuit is configured to select either the second control values or the third control values for output to the ramp signal generator in response to the decision point being triggered.

Aspect 13: The radar semiconductor chip of any of Aspects 1-12, wherein the sequencer is configured to execute a sequencing program associated with generating the frequency-modulated ramp signal, wherein the sequencing program includes at least one first ramp opcode that defines the at least one first frequency ramp having the first value of the ramp parameter, and at least one second ramp opcode that defines the at least one second frequency ramp having the second value of the ramp parameter, wherein the sequencer is configured to read the sequencing program, derive first control values for the at least one first frequency ramp based on the at least one first ramp opcode, and provide the first control values to the ramp signal generator for generating the at least one first frequency ramp, wherein the sequencer comprises an offset circuit configured to be disabled based on the indicator not being received prior to the decision point, or enabled based on the indicator being received prior to the decision point, wherein the sequencer is configured to read the sequencing program, and derive second control values based on the at least one second ramp opcode, wherein the offset circuit is configured to, while disabled, provide the second control values to the ramp signal generator for generating the at least one second frequency ramp, and wherein the offset circuit is configured to, while enabled, generate third control values by modifying the second control values with at least one offset value, and provide the third control values to the ramp signal generator for generating the at least one second frequency ramp.

Aspect 14: The radar semiconductor chip of any of Aspects 1-13, further comprising: a register configured to store a register value that indicates whether or not the indicator has been received prior to the decision point, wherein the sequencer is configured to evaluate the register value at the decision point.

Aspect 15: The radar semiconductor chip of any of Aspects 1-14, further comprising: an input terminal configured to receive the indicator as an input signal having a signal value that indicates whether or not the indicator has been received prior to the decision point, wherein the sequencer is configured to evaluate the signal value at the decision point.

Aspect 16: The radar semiconductor chip of any of Aspects 1-15, further comprising: an input terminal configured to receive an input signal having a signal value that indicates whether the second value or the third value of the ramp parameter should be used, wherein the input terminal is configured to be coupled to an external controller for receiving the input signal.

Aspect 17: The radar semiconductor chip of any of Aspects 1-16, wherein the indicator is an interference indicator that indicates whether interference has been detected in an environment, wherein the radar semiconductor chip further comprises: a receiver configured to detect the interference and generate the indicator.

Aspect 18: The radar semiconductor chip of any of Aspects 1-17, further comprising: an output terminal configured to provide an output signal to an external controller, wherein the output signal indicates a monitoring time interval during which the indicator is valid for the decision point.

Aspect 19: The radar semiconductor chip of any of Aspects 1-18, further comprising: an output terminal configured to provide an output signal that indicates whether the second value or the third value of the ramp parameter has been implemented for the at least one second frequency ramp, wherein the output terminal is configured to provide the output signal to an external controller.

Aspect 20: The radar semiconductor chip of any of Aspects 1-19, wherein the sequencer is configured to maintain a timing for each frequency ramp of the ramp scenario such that a predetermined time dependency for each frequency ramp of the ramp scenario, relative to each other frequency ramp of the ramp scenario, is preserved.

Aspect 21: The radar semiconductor chip of any of Aspects 1-20, wherein the indicator is an interference indicator that indicates whether interference has been detected in an environment.

Aspect 22: The radar semiconductor chip of any of Aspects 1-21, wherein the sequencer is configured to control the ramp signal generator to generate the at least one second frequency ramp with the second value of the ramp parameter, based on the indicator not being received within a monitoring time interval of the first portion of the ramp scenario, and wherein the sequencer is configured to control the ramp signal generator to generate the at least one second frequency ramp with the third value of the ramp parameter, based on the indicator being received within the monitoring time interval of the first portion of the ramp scenario.

Aspect 23: A method for controlling a radar circuit of a radar semiconductor chip, the method comprising: generating, by a ramp signal generator, a frequency-modulated ramp signal comprising a ramp scenario, wherein the ramp scenario comprises at least two consecutive portions, including a first portion and a second portion that are demarked by a decision point, wherein the first portion includes at least one first frequency ramp defined by a first value of a ramp parameter, and wherein the second portion includes at least one second frequency ramp defined by a second value of the ramp parameter or by a third value of the ramp parameter that is different from the second value of the ramp parameter; monitoring, by a sequencer, for an indicator; and controlling, by the sequencer, the ramp signal generator to generate the at least one second frequency ramp with the second value of the ramp parameter based on the indicator not being received prior to the decision point, or to generate the at least one second frequency ramp with the third value of the ramp parameter based on the indicator being received prior to the decision point.

Aspect 24: The method of Aspect 23, further comprising: evaluating at the decision point, by the sequencer, whether or not the indicator has been received within a monitoring time interval of the first portion of the ramp scenario.

Aspect 25: A system configured to perform one or more operations recited in one or more of Aspects 1-24.

Aspect 26: An apparatus comprising means for performing one or more operations recited in one or more of Aspects 1-24.

Aspect 27: A non-transitory computer-readable medium storing a set of instructions, the set of instructions comprising one or more instructions that, when executed by a device, cause the device to perform one or more operations recited in one or more of Aspects 1-24.

Aspect 28: A computer program product comprising instructions or code for executing one or more operations recited in one or more of Aspects 1-24.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable gate arrays (FPGAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A radar semiconductor chip, comprising:

a ramp signal generator configured to generate a frequency-modulated ramp signal comprising a ramp scenario, wherein the ramp scenario comprises at least two consecutive portions, including a first portion and a second portion that are demarked by a decision point during the ramp scenario, wherein the first portion includes at least one first frequency ramp defined by a first value of a ramp parameter, and wherein the second portion includes at least one second frequency ramp defined by a second value of the ramp parameter or by a third value of the ramp parameter that is different from the second value of the ramp parameter; and a sequencer configured to monitor for an indicator, wherein the sequencer is configured to evaluate whether or not the indicator has been received during the ramp scenario prior to the decision point, wherein the sequencer is configured to control the ramp signal generator to generate the at least one second frequency ramp with the second value of the ramp parameter, based on the indicator not being received prior to the decision point, and wherein the sequencer is configured to control the ramp signal generator to generate the at least one second frequency ramp with the third value of the ramp parameter, based on the indicator being received prior to the decision point.

2. The radar semiconductor chip of claim 1, wherein the sequencer is configured to monitor for the indicator during generation of the at least one first frequency ramp by the ramp signal generator.

3. The radar semiconductor chip of claim 1, wherein the ramp scenario corresponds to a single radar frame of a radar operation.

4. The radar semiconductor chip of claim 1, wherein the first value of the ramp parameter and the second value of the ramp parameter are the same.

5. The radar semiconductor chip of claim 1, wherein the sequencer is configured to execute a sequencing program associated with generating the frequency-modulated ramp signal, wherein the sequencing program includes at least one first ramp opcode that defines the at least one first frequency ramp having the first value of the ramp parameter, at least one second ramp opcode that defines the at least one second frequency ramp having the second value of the ramp parameter, and at least one third ramp opcode that defines the at least one second frequency ramp having the third value of the ramp parameter, wherein the sequencer is configured to read the sequencing program, derive first control values for the at least one first frequency ramp based on the at least one first ramp opcode, and provide the first control values to the ramp signal generator for generating the at least one first frequency ramp, wherein the sequencer is configured to derive, based on the indicator not being received prior to the decision point, second control values for the at least one second frequency ramp based on the at least one second ramp opcode, and provide the second control values to the ramp signal generator for generating the at least one second frequency ramp, and wherein the sequencer is configured to derive, based on the indicator being received prior to the decision point, third control values for the at least one second frequency ramp based on the at least one third ramp opcode, and provide the third control values to the ramp signal generator for generating the at least one second frequency ramp.

6. The radar semiconductor chip of claim 1, wherein the sequencer is configured to execute a sequencing program associated with generating the frequency-modulated ramp signal, wherein the sequencing program includes a decision point opcode corresponding to the decision point, wherein the decision point opcode is configured to trigger an evaluation by the sequencer of whether or not the indicator has been received prior to the decision point, and wherein the sequencer is configured to evaluate whether or not the indicator has been received prior to the decision point in response to reading the decision point opcode in the sequencing program.

7. The radar semiconductor chip of claim 1, wherein the sequencer is configured to generate first control values for the first portion of the ramp scenario, and provide the first control values to the ramp signal generator for generating the at least one first frequency ramp, wherein the sequencer is configured to generate second control values for the second portion of the ramp scenario, wherein the sequencer comprises an offset circuit configured to be disabled based on the indicator not being received prior to the decision point, or enabled based on the indicator being received prior to the decision point, wherein the offset circuit is configured to, while disabled, provide the second control values to the ramp signal generator for generating the at least one second frequency ramp, and wherein the offset circuit is configured to, while enabled, generate third control values by modifying the second control values with at least one offset value, and provide the third control values to the ramp signal generator for generating the at least one second frequency ramp.

8. The radar semiconductor chip of claim 7, further comprising:

a counter configured to count a number of frequency ramps generated for the ramp scenario of the frequency-modulated ramp signal; and a comparator circuit configured to trigger the decision point in response to the number of frequency ramps satisfying a threshold, wherein the comparator circuit is configured to enable the offset circuit in response to the decision point being triggered and in response to the indicator being received prior to the decision point.

9. The radar semiconductor chip of claim 1, wherein the sequencer comprises a selection circuit configured to output first control values for the first portion of the ramp scenario, and provide the first control values to the ramp signal generator for generating the at least one first frequency ramp, wherein the selection circuit is configured to, based on the indicator not being received prior to the decision point, output second control values for the second portion of the ramp scenario, and provide the second control values to the ramp signal generator for generating the at least one second frequency ramp, and wherein the selection circuit is configured to, based on the indicator being received prior to the decision point, output third control values for the second portion of the ramp scenario, and provide the third control values to the ramp signal generator for generating the at least one second frequency ramp.

10. The radar semiconductor chip of claim 9, wherein the first control values includes the first value of the ramp parameter, the second control values includes the second value of the ramp parameter, and the third control values includes the third value of the ramp parameter.

11. The radar semiconductor chip of claim 9, further comprising:

a counter configured to count a number of frequency ramps generated for the ramp scenario of the frequency-modulated ramp signal; and a comparator circuit configured to trigger the decision point in response to the number of frequency ramps satisfying a threshold, wherein the selection circuit is configured to select either the second control values or the third control values for output to the ramp signal generator in response to the decision point being triggered.

12. The radar semiconductor chip of claim 1, wherein the sequencer is configured to execute a sequencing program associated with generating the frequency-modulated ramp signal, wherein the sequencing program includes at least one first ramp opcode that defines the at least one first frequency ramp having the first value of the ramp parameter, and at least one second ramp opcode that defines the at least one second frequency ramp having the second value of the ramp parameter, wherein the sequencer is configured to read the sequencing program, derive first control values for the at least one first frequency ramp based on the at least one first ramp opcode, and provide the first control values to the ramp signal generator for generating the at least one first frequency ramp, wherein the sequencer comprises an offset circuit configured to be disabled based on the indicator not being received prior to the decision point, or enabled based on the indicator being received prior to the decision point, wherein the sequencer is configured to read the sequencing program, and derive second control values based on the at least one second ramp opcode, wherein the offset circuit is configured to, while disabled, provide the second control values to the ramp signal generator for generating the at least one second frequency ramp, and wherein the offset circuit is configured to, while enabled, generate third control values by modifying the second control values with at least one offset value, and provide the third control values to the ramp signal generator for generating the at least one second frequency ramp.

13. The radar semiconductor chip of claim 1, further comprising:

a register configured to store a register value that indicates whether or not the indicator has been received prior to the decision point, wherein the sequencer is configured to evaluate the register value at the decision point.

14. The radar semiconductor chip of claim 1, further comprising:

an input terminal configured to receive the indicator as an input signal having a signal value that indicates whether or not the indicator has been received prior to the decision point, wherein the sequencer is configured to evaluate the signal value at the decision point.

15. The radar semiconductor chip of claim 1, further comprising:

an input terminal configured to receive an input signal having a signal value that indicates whether the second value or the third value of the ramp parameter should be used, wherein the input terminal is configured to be coupled to an external controller for receiving the input signal.

16. The radar semiconductor chip of claim 1, wherein the indicator is an interference indicator that indicates whether interference has been detected in an environment, wherein the radar semiconductor chip further comprises:

a receiver configured to detect the interference and generate the indicator.

17. The radar semiconductor chip of claim 1, further comprising:

an output terminal configured to provide an output signal to an external controller, wherein the output signal indicates a monitoring time interval during which the indicator is valid for the decision point.

18. The radar semiconductor chip of claim 1, further comprising:

an output terminal configured to provide an output signal that indicates whether the second value or the third value of the ramp parameter has been implemented for the at least one second frequency ramp, wherein the output terminal is configured to provide the output signal to an external controller.

19. The radar semiconductor chip of claim 1, wherein the sequencer is configured to maintain a timing for each frequency ramp of the ramp scenario such that a predetermined time dependency for each frequency ramp of the ramp scenario, relative to each other frequency ramp of the ramp scenario, is preserved.

20. The radar semiconductor chip of claim 1, wherein the indicator is an interference indicator that indicates whether interference has been detected in an environment.

21. The radar semiconductor chip of claim 1, wherein the sequencer is configured to control the ramp signal generator to generate the at least one second frequency ramp with the second value of the ramp parameter, based on the indicator not being received within a monitoring time interval of the first portion of the ramp scenario, and wherein the sequencer is configured to control the ramp signal generator to generate the at least one second frequency ramp with the third value of the ramp parameter, based on the indicator being received within the monitoring time interval of the first portion of the ramp scenario.

22. A method for controlling a radar circuit of a radar semiconductor chip, the method comprising:

generating, by a ramp signal generator, a frequency-modulated ramp signal comprising a ramp scenario, wherein the ramp scenario comprises at least two consecutive portions, including a first portion and a second portion that are demarked by a decision point during the ramp scenario, wherein the first portion includes at least one first frequency ramp defined by a first value of a ramp parameter, and wherein the second portion includes at least one second frequency ramp defined by a second value of the ramp parameter or by a third value of the ramp parameter that is different from the second value of the ramp parameter;

monitoring, by a sequencer, for an indicator;

evaluating whether or not the indicator has been received during the ramp scenario prior to the decision point; and controlling, by the sequencer, the ramp signal generator to generate the at least one second frequency ramp with the second value of the ramp parameter based on the indicator not being received prior to the decision point, or to generate the at least one second frequency ramp with the third value of the ramp parameter based on the indicator being received prior to the decision point.

23. The method of claim 22, further comprising:

evaluating at the decision point, by the sequencer, whether or not the indicator has been received within a monitoring time interval of the first portion of the ramp scenario.

24. The method of claim 22, wherein monitoring for the indicator comprises:

monitoring for the indicator during generation of the at least one first frequency ramp.

* * * * *